(12) United States Patent
Akahane

(10) Patent No.: US 9,589,720 B2
(45) Date of Patent: Mar. 7, 2017

(54) SIGNAL TRANSMISSION DEVICE AND SWITCHING POWER SUPPLY

(71) Applicant: FUJI ELECTRIC CO., LTD., Kawasaki-shi (JP)

(72) Inventor: Masashi Akahane, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 817 days.

(21) Appl. No.: 14/023,554

(22) Filed: Sep. 11, 2013

(65) Prior Publication Data

US 2014/0103736 A1    Apr. 17, 2014

(30) Foreign Application Priority Data

Oct. 11, 2012    (JP) .................................. 2012-225590

(51) Int. Cl.
| | | |
|---|---|---|
| H01F 19/04 | (2006.01) | |
| H01F 38/14 | (2006.01) | |
| H04L 25/02 | (2006.01) | |
| H01F 19/08 | (2006.01) | |

(52) U.S. Cl.
CPC ............. *H01F 38/14* (2013.01); *H01F 19/04* (2013.01); *H04L 25/0266* (2013.01); *H01F 2019/085* (2013.01)

(58) Field of Classification Search
USPC ....................................................... 307/104
See application file for complete search history.

(56) References Cited

U.S. PATENT DOCUMENTS

| | | | |
|---|---|---|---|
| 7,692,444 B2 | 4/2010 | Chen et al. | |
| 7,719,305 B2 * | 5/2010 | Chen | H03K 19/003 326/21 |
| 7,920,010 B2 | 4/2011 | Chen, Jr. et al. | |
| 2005/0269657 A1 * | 12/2005 | Dupuis | H01L 23/66 257/446 |
| 2008/0304292 A1 * | 12/2008 | Zeng | H02M 3/285 363/21.12 |

FOREIGN PATENT DOCUMENTS

JP    2008-502215 A    1/2008

\* cited by examiner

*Primary Examiner* — Rexford Barnie
*Assistant Examiner* — Xuan Ly
(74) *Attorney, Agent, or Firm* — Rossi, Kimms & McDowell LLP

(57) ABSTRACT

A signal transmission device of aspects of the invention can include a master circuit connected to the primary sides of first and second transformers and a slave circuit connected to the secondary sides of the first and second transformers. The master circuit sets one of first and second transmitting/receiving circuits for transmitting operation and the other for receiving operation according to a control signal, and detecting a leading edge and a falling edge of the control signal, transmits a pulse signal with the pulse interval changing after a predetermined period of time. The slave circuit detects the change of the pulse interval of the signal received through third and fourth transmitting/receiving circuits and according to the detection result, sets one of the third and fourth transmitting/receiving circuits for receiving operation and the other for transmitting operation.

11 Claims, 26 Drawing Sheets

US 9,589,720 B2

SIGNAL TRANSMISSION DEVICE AND SWITCHING POWER SUPPLY

CROSS-REFERENCE TO RELATED APPLICATION

This application is based on, and claims priority to, Japanese Patent Application No. 2012-225590, filed on Oct. 11, 2012, the contents of which are incorporated herein by reference in their entirety.

BACKGROUND OF THE INVENTION

1. Field of the Invention

Aspects of the invention relate to signal transmission devices that perform simultaneous bi-directional communication between a master circuit and a slave circuit that are connected with isolation by a transformer.

2. Description of the Related Art

A switching power supply for controlling an electric power to be supplied to a load such as a motor has, for example, a construction as shown in FIG. 23 comprising a first and second switching elements Q1 and Q2 connected in series to compose a half-bridge circuit that are alternately ON/OFF-controlled to switch an input voltage E. The switching elements Q1 and Q2 can be a high-voltage IGBT or MOS-FET. The voltage VS at the series-connection point between the switching elements Q1 and Q2 is delivered to the load, which is not shown in the figure.

A switching control device ON/OFF-controls alternately the first and second switching elements Q1 and Q2 composing the main body of the switching power supply. The switching control device is provided with a microprocessor (MPU) 1 that generates control signals HIN and LIN for ON-driving the switching elements Q1 and Q2 alternately. A switching control circuit 3 generates driving control signals Hdrv and Ldrv for the switching elements Q1 and Q2 according to the signals XdrvH and XdrvL from an input buffer (BUF) 2 based on the control signals HIN and LIN.

A high side driver circuit 4 ON/OFF-drives the first switching element Q1 according to the driving control signal Hdrv, and a low side driver circuit 5 ON/OFF-drives the second switching element Q2 according to the driving control signal Wry.

The second switching element Q2 operates on a reference potential of the ground potential GND, while the first switching element Q1 operates on a reference potential of the voltage VS at the series connection point between the first switching element Q1 and the second switching element Q2, the voltage VS being the output voltage to the load. As a consequence, the high side driver circuit 4 for driving the first switching element Q1 is also operated on the reference potential of the voltage VS.

Consequently, in the path for transmitting the driving control signal Hdrv provided is a level shift circuit that level-shifts the output of the switching control circuit 3 and delivers to the high side driver circuit 4. Alternatively in place of the level shift circuit, an isolation circuit 6 is provided that electrically isolates the high side driver circuit 4 from the switching control circuit 3 and delivers the output of the switching control circuit 3 to the high side driver circuit 4. The isolation circuit 6 can be composed mainly of a coreless micro-transformer.

Such a type of isolation circuit 6 comprises, as shown in FIG. 24, two micro-transformers MT1 and MT2 for a set signal and a reset signal, a transmitting circuit TX connected to the primary sides of the micro-transformers MT1 and MT2, and a receiving circuit RX connected to the secondary sides of the micro-transformers MT1 and MT2. As shown by the operation waveforms in FIG. 25, a set signal SET-TX generated at the timing of leading edge of a control signal DATA-IN delivered to the transmitting circuit TX is given to the primary side of the micro-transformer MT1 for a set signal, and a set signal SET-RX is obtained from the secondary side of the micro-transformer MT1. A reset signal RES-TX generated at the timing of falling edge of the control signal DATA-IN is given to the primary side of the micro-transformer MT2 for a reset signal, and a reset signal RES-RX is obtained from the secondary side of the micro-transformer MT2. From the set signal SET-RX and the reset signal RES-RX, the control signal DATA-IN is demodulated to obtain an output signal DATA-OUT. This type of isolation circuit is disclosed in U.S. Pat. No. 7,692,444 (also referred to herein as "Patent Document 1").

An isolation circuit can be composed using a single micro-transformer MT as shown in FIG. 26 and FIG. 28. Operation waveforms of the isolation circuit of FIG. 26 are shown in FIG. 27, in which the number of pulses of the set signal SET-TX generated at the timing of leading edge of the control signal DATA-IN delivered to the transmitting circuit TX and given to the primary side of the micro-transformer MT is different from the number of pulses of the reset signal RES-TX generated at the timing of falling edge of the control signal DATA-IN. Discrimination between the received set signal SET-RX and the reset signal RES-RX is performed detecting the number of pulses of the SET-RX and the RES-RX obtained at the secondary side of the micro-transformer MT. From the discriminated set signal SET-RX and reset signal RES-RX, the control signal DATA-IN is demodulated to obtain an output signal DATA-OUT. This type of isolation circuit is disclosed in U.S. Pat. No. 7,920,010 (also referred to herein as "Patent Document 2").

Operation waveforms of the isolation circuit of FIG. 28 are shown in FIG. 29, in which the modulation frequency of the signal given to the primary side of the micro-transformer MT during a period of an H level of the control signal DATA-IN given to the transmitting circuit TX is made different from the modulation frequency during a period of an L level of the control signal DATA-IN. From discrimination of the modulated frequency of the signal obtained at the secondary side of the micro-transformer MT, the control signal DATA-IN is demodulated to obtain an output signal DATA-OUT. This type of isolation circuit is disclosed in U.S. Pat. No. 7,719,305 (also referred to herein as "Patent Document 3").

The switching power supply shown in FIG. 23 performs control for protecting the switching elements Q1 and Q2 in which any abnormality occurred in the switching element Q1 or Q2 is detected and communicated from the side of the driver circuit 4 or 5 to the switching control circuit 3. The abnormality that possibly occurs in the switching element Q1 or Q2 includes, for example, overcurrent through the switching element Q1 or Q2, abnormal heating in the switching element, and abnormal drop of the output voltage VS due to load short-circuit.

The isolation circuits disclosed in Patent Documents 1, 2, and 3 however, are only provided with a unidirectional signal transmission capability that transmits the control signal Hdrv (or DATA-IN) only in the direction from the switching control circuit 3 to the driver circuit 4. In order to communicate the abnormality information (an alarm signal) mentioned above from the driving circuit 4 to the switching control circuit 3, another isolation circuit is required capable of signal transmission in the opposite direction. Thus, the isolation circuit inevitably becomes complicated.

SUMMARY OF THE INVENTION

Embodiments of the invention address the above-discussed shortcomings of the related art. Some embodiments provide a signal transmission device that performs simultaneous bi-directional signal transmission between a master circuit and a slave circuit connected with electric isolation by a transformer, for example between a switching control circuit and a driving circuit in a switching power supply.

Some embodiments provide a switching power supply that switches an input power by ON/OFF-controlling alternately a first switching element and a second switching element connected in series and delivers an electric power to a load from a point of series connection of the first and second switching elements, in which the switching power supply comprises an isolation circuit for signal transmission with electrical isolation between one of driving circuits of ON/OFF-driving of the first and second switching elements and a switching control circuit for generating a driving control signal, the isolation circuit using the signal transmission device of the invention as stated above.

In order to achieve the object stated above, in some embodiments, a signal transmission device of the present invention comprises: first and second transformers provided in parallel; a master circuit connected to terminals in a primary side of the first transformer and terminals in a primary side of the second transformer; a slave circuit connected to terminals in a secondary side of the first transformer and terminals in a secondary side of the second transformer; the master circuit including; a first transmitting/receiving circuit for transmitting/receiving a signal to/from a side of the slave circuit through the first transformer, a second transmitting/receiving circuit for transmitting/receiving a signal to/from the side of the slave circuit through the second transformer, and a master control circuit that detects a leading edge and a falling edge of a transmitting signal to be transmitted to the slave circuit, sets one of the transmitting/receiving circuits for transmitting operation and the other for receiving operation, and transmits a signal with varying pulse intervals after passing a predetermined period of time since the detection of the leading edge or the falling edge; the slave circuit including; a third transmitting/receiving circuit for transmitting/receiving a signal to/from a side of the master circuit through the first transformer, a fourth transmitting/receiving circuit for transmitting/receiving a signal to/from the side of the master circuit through the second transformer, and a slave control circuit that detects variation of the pulse intervals of a signal transmitting/receiving through the third and fourth transmitting/receiving circuit, sets one of the third and fourth transmitting/receiving circuits for receiving operation and the other for transmitting operation, and generates and transmits a pulse signal corresponding to transmitting signal to be transmitted to the master circuit.

In some embodiments, the slave control circuit comprises: a pulse period detecting circuit for detecting change of the pulse intervals of a signal transmitting/receiving through the third and fourth transmitting/receiving circuit, and a latching circuit for demodulating the transmitting signal from the master circuit corresponding to a result of detection by the pulse period detecting circuit.

In some embodiments, the pulse period detecting circuit receives a signal given from the third and fourth transmitting/receiving circuits through a common-mode input rejection circuit and detects change of the pulse interval of the signal through the common-mode input rejection circuit.

In some embodiments, the master control circuit comprises a latching and timer circuit that demodulates a signal transmitted from the slave circuit corresponding to a state of the signal received through the first and second transmitting/receiving circuit.

In some embodiments, the master control circuit detects the leading and falling edges of the transmitting signal and transmits a pulse signal with a first pulse interval for a predetermined period of time and then transmits a pulse signal with a second pulse interval that is longer than the first pulse interval.

In some embodiments, each of the first and second transformers is a coreless micro-transformer.

A switching power supply according to the In some embodiments of the invention comprises: a main body of the switching power supply that includes first and second switching elements connected in series, the switching elements being ON/OFF-controlled alternately to switch an input power, and the main body delivering electric power from a series connection point of the first and second switching elements to a load; a switching control circuit that generates a control signal to ON-drive alternately the first and second switching elements; first and second driver circuits, the first driver circuit being provided for ON-driving the first switching element receiving the control signal and the second driver circuit being provided for ON-driving the second switching element receiving the control signal; an isolating circuit that performs electrical isolation between one of the first and second driver circuits and the switching control circuit and transmits the control signal generated by the switching control circuit to the one of the first and second driver circuits, the isolating circuit being the signal transmission device defined previously, In some embodiments, the first driver circuit operates on a reference voltage of a voltage at the series connection point of the first and second switching elements and drives the first switching element in a high side, and the second driver circuit operates with a reference voltage of a ground potential and drives the second switching element in a low side, and the isolating circuit is provided between the switching control circuit that operates on the reference voltage of the ground potential and the first driver circuit.

Alternatively, in some embodiments, the first driver circuit operates on a reference voltage of the input voltage and drives the first switching element in a high side, and the second driver circuit operates on a reference voltage of a voltage at the series connection point of the first and second switching elements and drives the second switching element in a low side, and the isolating circuit is provided between the switching control circuit that operates on the reference voltage of the input voltage and the second driver circuit.

In some embodiments, the isolating circuit transmits the control signal toward the driver circuit and transmits an alarm signal indicating abnormality detected in the side of the driver circuit to the switching control circuit.

In some embodiments, the first and the second switching elements are high voltage IGBTs or MOS-FETs and compose a half-bridge to supply electric power to the load.

In a signal transmitting device of some embodiments, the side of the master circuit sets one of the first and second transformers for transmitting operation and sets the other for receiving operation, corresponding to the transmitting signal to be transferred from the master circuit to the slave circuit. Thus, the transmitting signal is transferred to the side of the slave circuit through the one of the first and second transformers, and at the same time, the master circuit receives a signal transmitted from the side of the slave circuit through the other of the first and second transformers.

In some embodiments, the side of the slave circuit sets one of the first and second transformers for transmitting operation and sets the other for receiving operation corresponding to the signal received through the first and second transformers. The slave circuit side detects change of pulse intervals of the signal transferred from the master circuit through the one of the first and second transformer, and demodulates the transmitted signal. In addition to receiving the signal, the slave circuit transmits a signal such as an alarm signal to the master circuit side utilizing the other transformer that is not in use for signal transmission from the master circuit.

In some embodiments, the signal transmission device of the invention transmits a pulse signal generated upon detection of a leading edge of the transmitting signal as a pulse signal for setting indicating the timing of leading edge of the transmitting signal through the first transformer, and transmits a pulse signal generated upon detection of a falling edge of the transmitting signal as a pulse signal for resetting indicating the timing of falling edge of the transmitting signal through the second transformer. This operation by the signal transmission device with a simple construction is only needed to achieve reliable transmission of the transmitting signal. Moreover, simultaneously with this transmission of the transmitting signal, signal transmission from the slave circuit to the master circuit is performed utilizing a transformer that is not in use for transmission of the transmitting signal. Therefore, the signal transmission device of the invention performs simultaneous bi-directional communication between the master circuit and the slave circuit in simple control.

In some embodiments, the signal transmission device described above can be employed for an isolating circuit of a switching power supply, the isolating circuit being arranged between a driving circuit for driving a switching element and a switching control circuit. Transmitting a control signal for ON/OFF-driving the switching element to the driving circuit, the switching control circuit can at the same time receive an alarm signal indicating abnormality in the switching element detected in the side of the driving circuit. The device of the invention does not need to prepare two antiparallel-connected isolating circuits each providing only single direction signal transmission. Therefore, a device of some embodiments of the invention has an advantage of simple construction.

DETAILED DESCRIPTION

The following describes an example of signal transmission device and a switching power supply according to a preferred embodiment of the present invention with reference to accompanying drawings.

Figure 1:
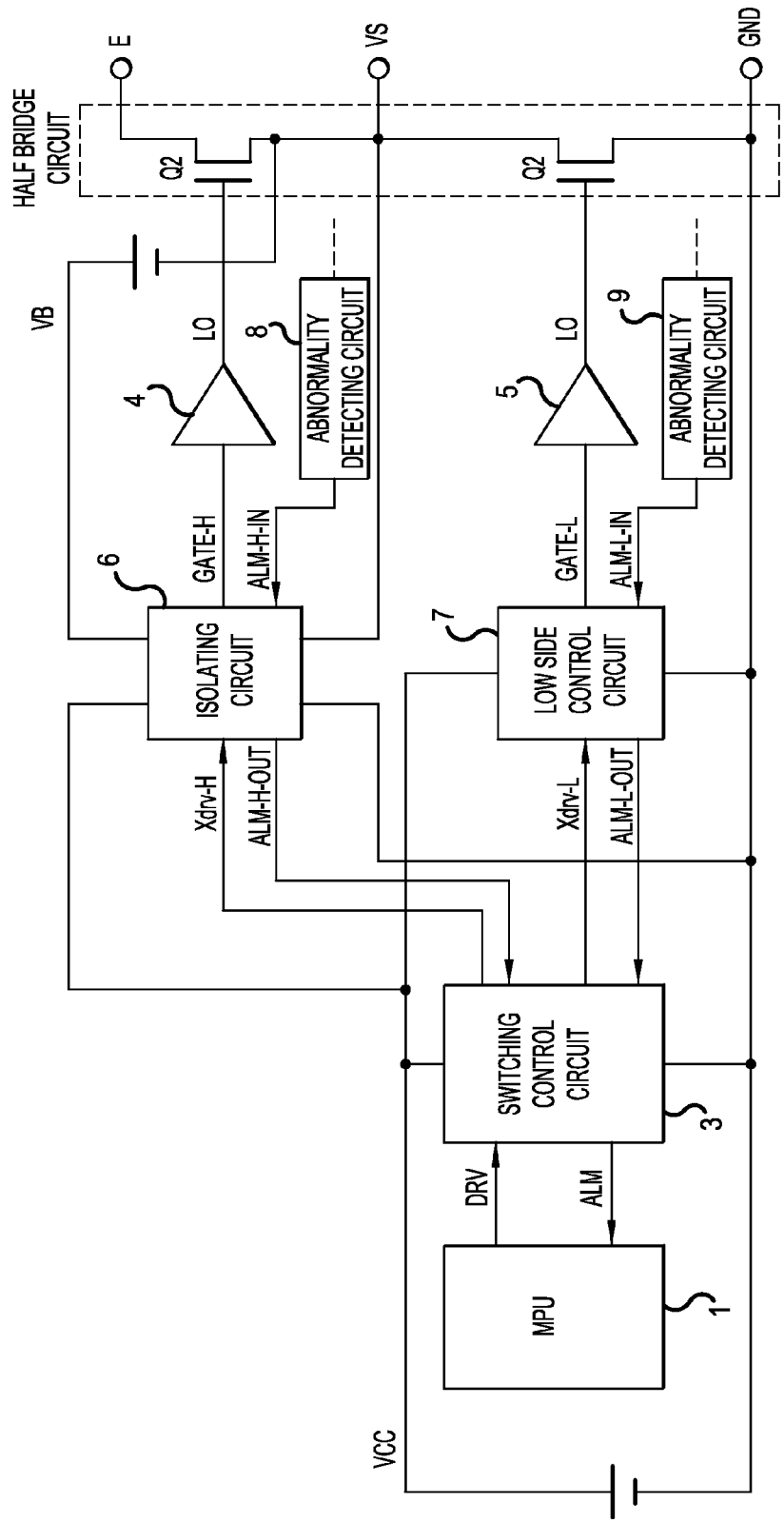
FIG. 1 shows a schematic construction of a switching power supply according to an embodiment of the present invention.
Figure 2:
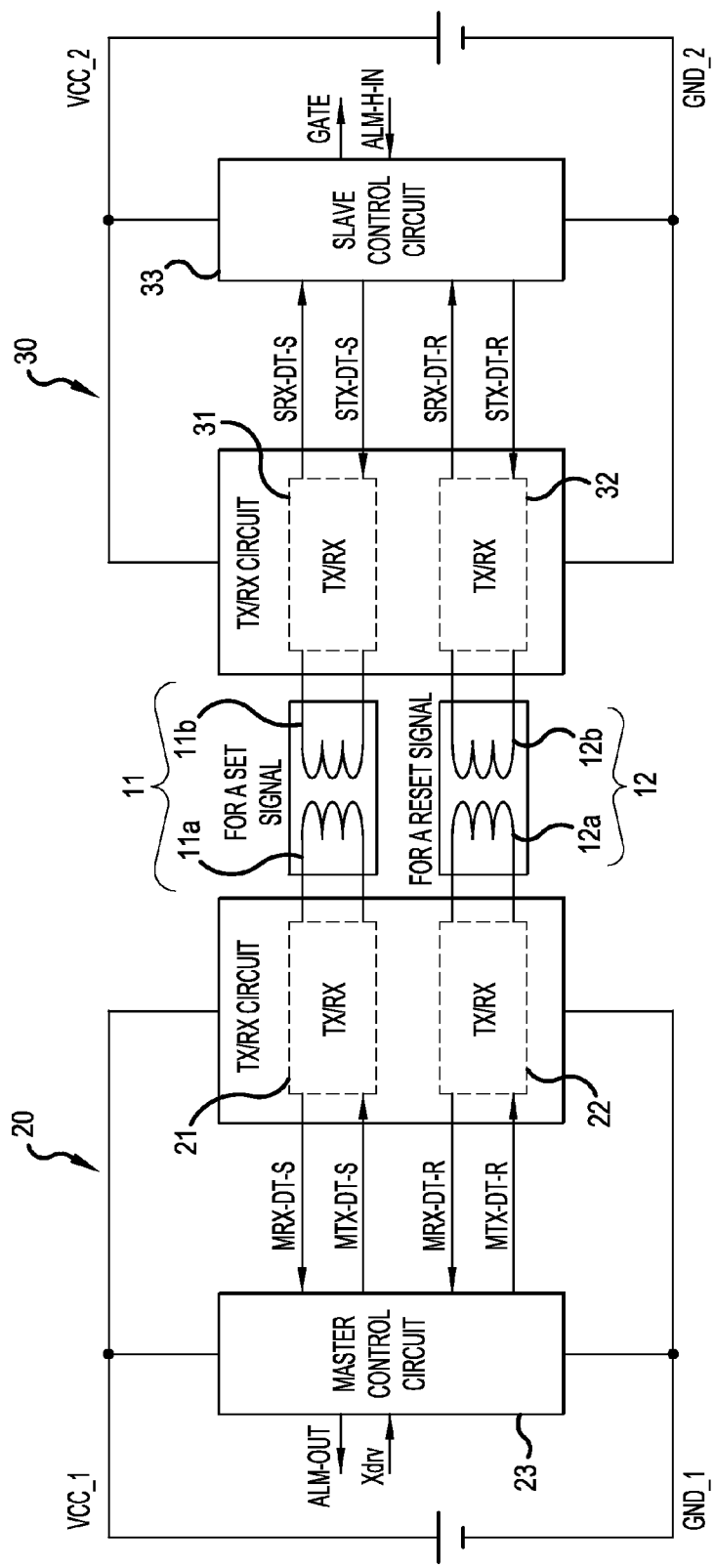
FIG. 2 shows a schematic construction of a signal transmission device according to an embodiment of the present invention.

FIG. 1 shows a schematic construction of a switching power supply according to an embodiment of the present invention, and FIG. 2 shows a schematic construction of a signal transmission device according to an embodiment of the present invention.

Figure 23:
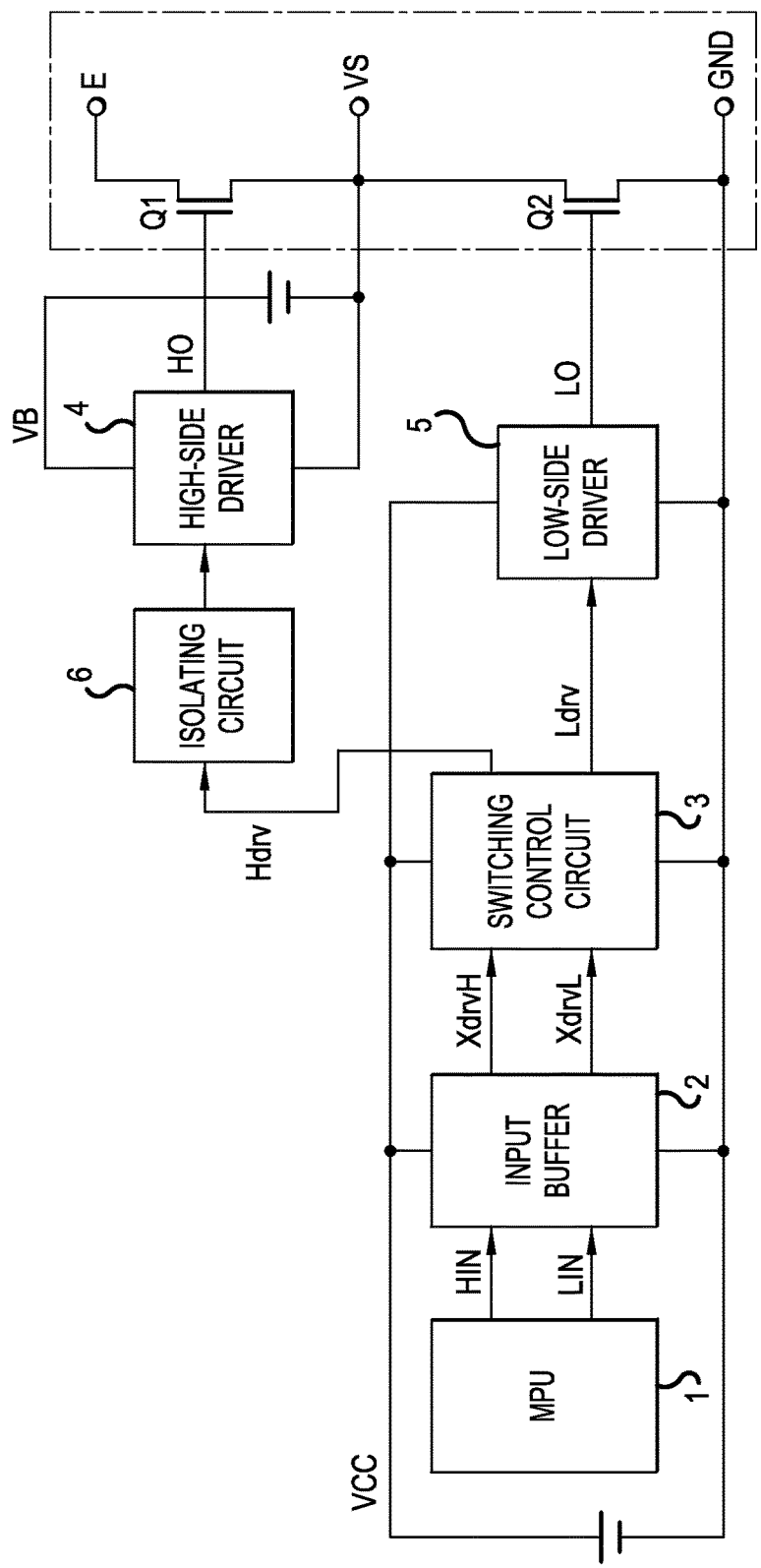
FIG. 23 shows a schematic construction of a switching power supply.
Figure 24:
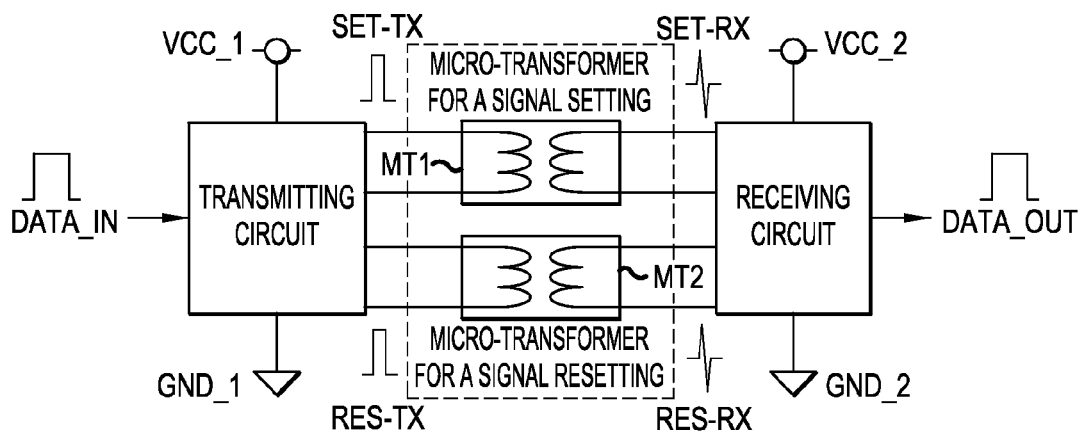
FIG. 24 shows a schematic construction of the isolation circuit disclosed in Patent Document 1.
Figure 25:
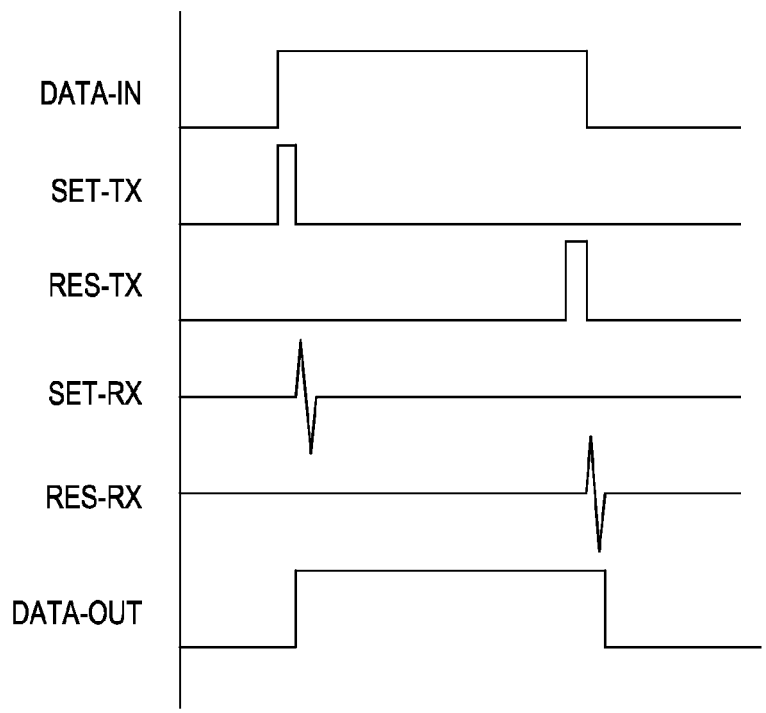
FIG. 25 shows operation waveforms in the isolation circuit of FIG. 24.
Figure 26:
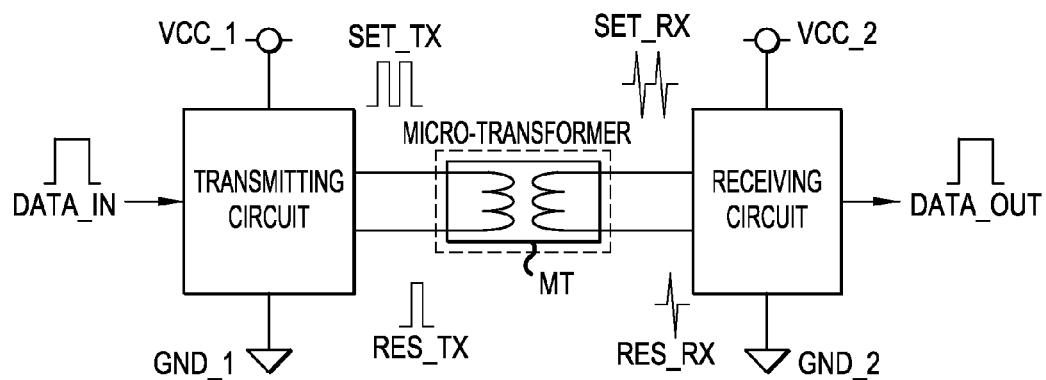
FIG. 26 shows a schematic construction of the isolation circuit disclosed in Patent Document 2.
Figure 27:
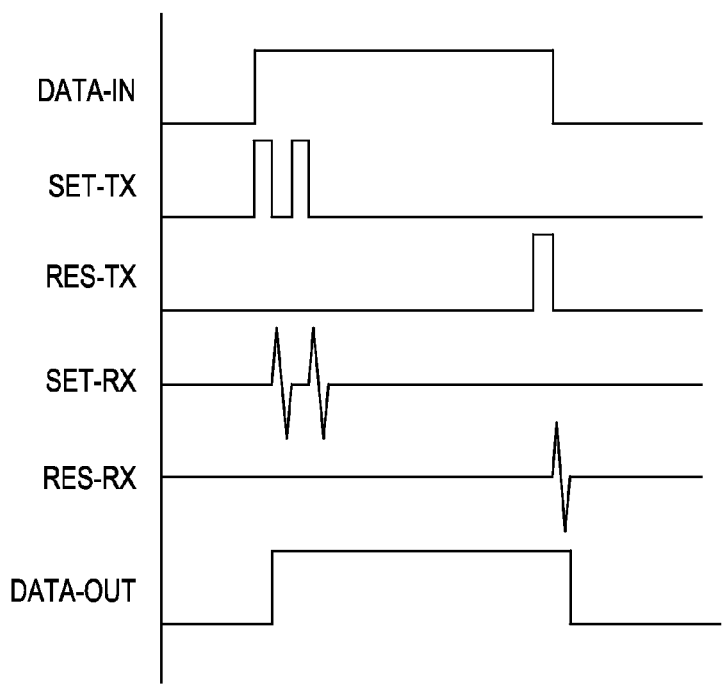
FIG. 27 shows operation waveforms in the isolation circuit of FIG. 26.
Figure 28:
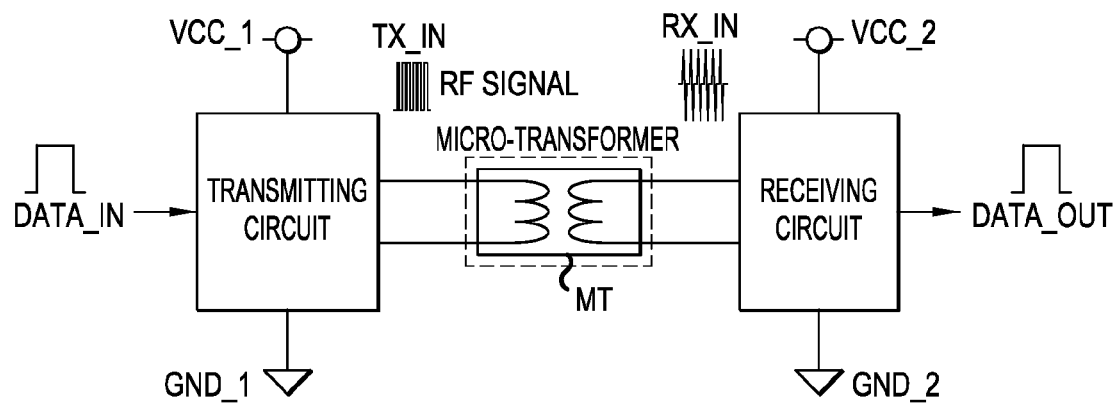
FIG. 28 shows a schematic construction of the isolation circuit disclosed in Patent Document 3.
Figure 29:
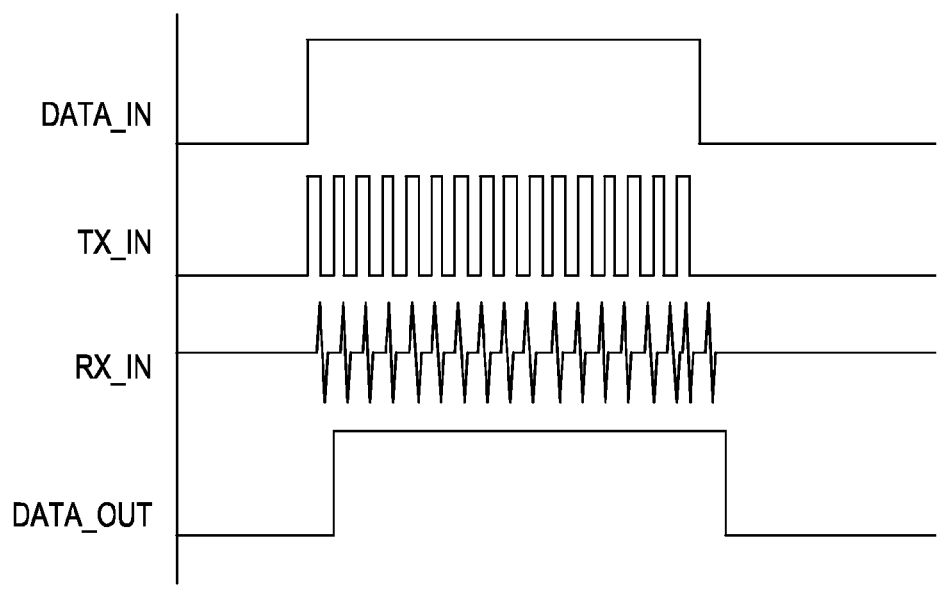
FIG. 29 shows operation waveforms in the isolation circuit of FIG. 28.

This switching power supply has basically the same construction as that of FIG. 23 and the similar parts are given the same symbols. The switching power supply is characterized in that the isolation circuit 6 provided between the switching control circuit 3 and the high side driver circuit 4 is a signal transmission device 10 having a construction as shown in FIG. 2. The switching power supply comprise 3 a low side control circuit 7 between the switching control circuits and the low side driver circuit 5.

The switching power supply is provided with abnormality detecting circuits 8 and 9 for detecting abnormality in the first and second switching elements Q1 and Q2 in the high side and low side, respectively. Alarm signals ALM, a signal ALM-H-IN and a signal ALM-L-IN, detected by the abnormality detecting circuits 8 and 9 are transmitted to the switching control circuit 3 through the isolation circuit 6 and the low side control circuit 7, respectively. The low side control circuit 7 is a buffer circuit that receives a control signal Xdrv-L from the switching control circuit 3 and delivers an output signal GATE-L to the low side driver circuit 5, and holds the alarm signal ALM-L-IN from the abnormality detecting circuit 9 and transfers the alarm signal to the switching control circuit 3.

The signal transmission device 10 used for the isolation circuit 6 comprises a first transformer 11 and a second transformer 12 arranged in parallel with each other as shown in the schematic construction of the signal transmission device of FIG. 2. The primary windings 11a and 12a of the respective first and second transformers 11 and 12 are connected to a master circuit 20, and the secondary windings 11b and 12b of the respective first and second transformers 11 and 12 are connected to a slave circuit 30. The first and second transformers 11 and 12 electrically isolate the master circuit 20 and the slave circuit 30, and perform signal transmission between the master circuit 20 and the slave circuit 30. The first and second transformers 11 and 12 are each composed of, for example, a coreless micro-transformer that can be packaged in an integrated circuit.

The master circuit 20 specifically comprises a first transmitting/receiving circuit (TX/RX) 21 connected to the primary winding 11a of the first transformer 11 and a second transmitting/receiving circuit (TX/RX) 22 connected to the primary winding 12a of the second transformer 12. The first and second transmitting/receiving circuits 21 and 22 are used alternatively for transmitting (sending) a signal or for receiving a signal according to a control signal Xdrv from a master control circuit 23.

The slave circuit 30 comprises a third transmitting/receiving circuit (TX/RX) 31 connected to the secondary winding 11b of the first transformer 11 and a fourth transmitting/receiving circuit (TX/RX) 32 connected to the secondary winding 12b of the second transformer 12. The third and fourth transmitting/receiving circuits 31 and 32 are used alternatively for transmitting (sending) a signal or for receiving a signal according to control of a slave control circuit 33. When the first transmitting/receiving circuit 21 is used for transmitting a signal, the third transmitting/receiving circuit 31 is used exclusively for receiving a signal and not used for transmitting (sending) a signal.

Figure 3:
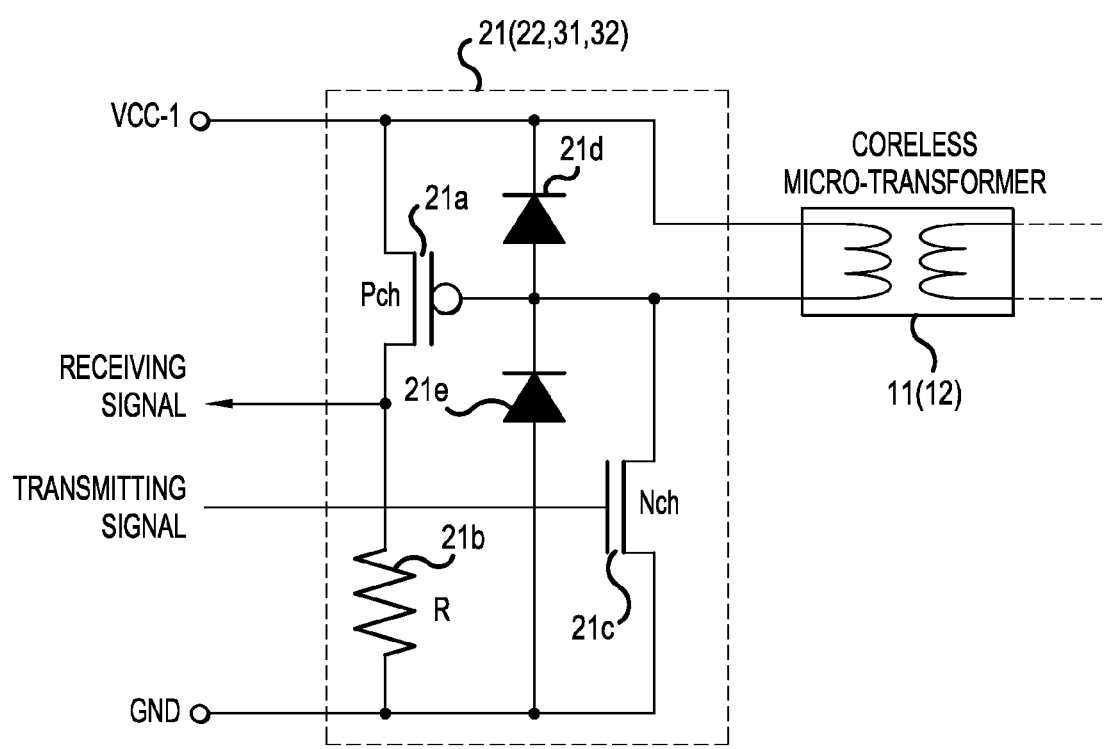
FIG. 3 shows an example of construction of a signal transmitting/receiving circuit in the signal transmission device of FIG. 2.

FIG. 3 shows a schematic construction of the first transmitting/receiving circuit 21 as a representative construction of the four first through fourth transmitting/receiving circuits 21, 22, 31, and 32. The first transmitting receiving circuit 21 comprises an N-channel MOS-FET 21c that has a drain terminal thereof linked to a power supply VCC-1 through the primary winding 11a of the first transformer 11 in series and a source terminal thereof connected to the ground line, and turns ON upon receiving a transmitting signal at a gate terminal thereof for transmitting (sending) a signal. The transmitting/receiving circuit 21 also comprises a P-channel MOS-FET 21a that has a drain terminal thereof linked to the ground line through a resistor 21b and a source terminal thereof connected to the power supply VCC-1 to form an amplifier circuit, and turns ON upon receiving a signal occurred across the primary winding 11a of the first transformer 11 at a gate terminal thereof for receiving a signal.

A diode 21d is connected between the gate and source of the P-channel MOS-FET 21a in anti-parallel thereto, and a diode 21e is connected between the source and drain of the N-channel MOS-FET 21c in anti-parallel thereto. The diodes 21d and 21e are provided for the purpose of protecting the gate potential of the P-channel MOS-FET 21a and the drain of the N-channel MOS-FET 21c.

The second through fourth transmitting/receiving circuits 22, 31, and 32 are constructed in the same construction as the first transmitting/receiving circuit 21 except for a difference in the winding of the primary windings 11a and 12a and the secondary windings 11b and 12b of the first and second transformers 11 and 12 to which the transmitting/receiving circuit is connected, and a difference in the power supply of the VCC-1 in the side of master circuit 20 and the VCC-2 in the side of slave circuit 30 to which the transmitting/receiving circuit is connected in operation thereof. Thus, description on the second, third and fourth transmitting/receiving circuits 22, 31, and 32 is omitted here.

Figure 4:
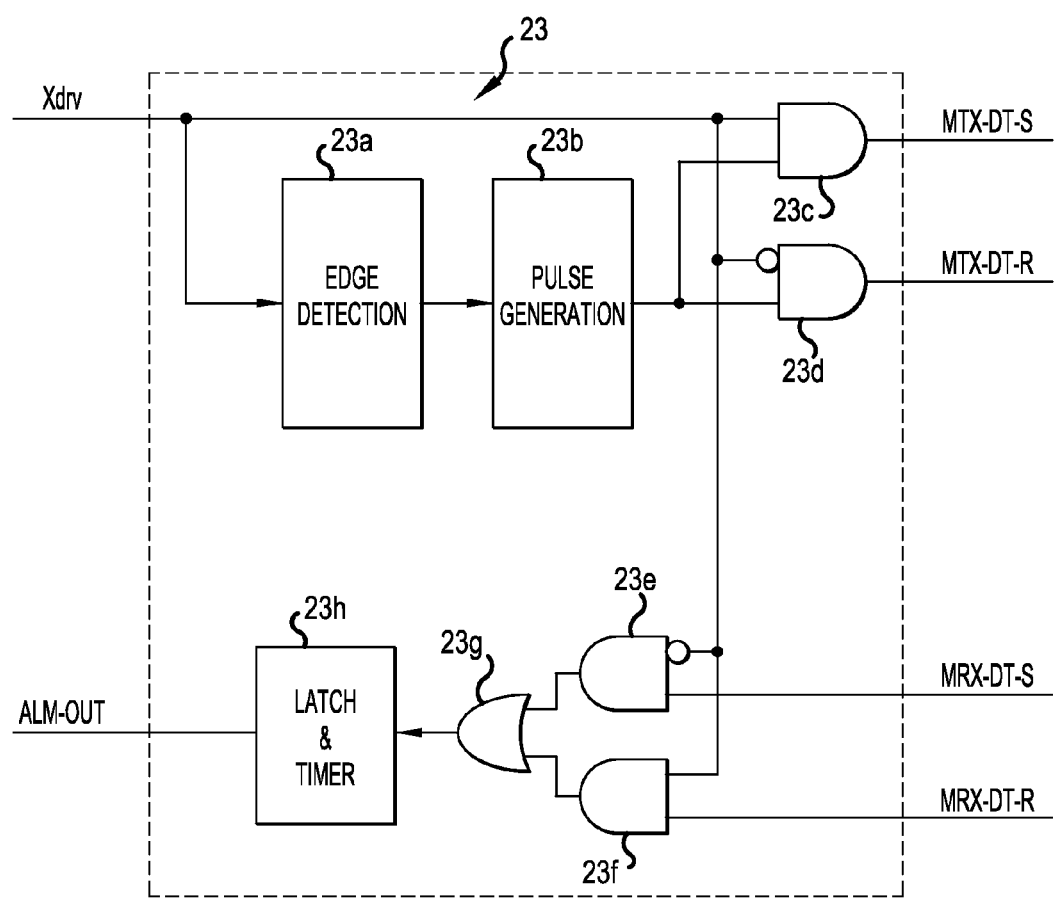
FIG. 4 shows an example of construction of a master control circuit in the signal transmission device of FIG. 2.

FIG. 4 shows an example of schematic construction of the master control circuit 23. The master control circuit 23 comprises an edge detecting circuit 23a that receives a control signal Xdrv and detects the leading and falling edges of the control signal Xdrv, and a pulse generating circuit 23b that receives the output of the edge detecting circuit 23a and generates a pulse signal with a predetermined period. The pulse generating circuit 23b, starting at the moment of detecting the leading edge or starting at the moment of detecting the falling edge of the control signal Xdrv, generates pulse signals with first intervals for a first period of time before generating pulse signals with second intervals that are longer than the first interval for a second period of time. The number of pulses generated in the first and second periods of time is three in the timing charts shown in FIGS. 6 through 9, but the number is of course not limited to a special value.

The pulse signal generated in the pulse generating circuit 23b passes through a first gate circuit 23c that is made active according to the control signal Xdrv, and is delivered as a transmitting signal MTX-DT-S for setting operation to the first transmitting/receiving circuit 21. The pulse signal generated in the pulse generating circuit 23b passes through a second gate circuit 23d that is made active, alternatively to the first gate circuit 23c, according to the control signal Xdrv, and is delivered as a transmitting signal MTX-DT-R for resetting to the second transmitting/receiving circuit 22. The first gate circuit 23c becomes active when the control signal Xdrv is at an H level, and the second gate circuit 23d becomes active when the control signal Xdrv is at an L level. Consequently, the transmitting signal MTX-DT-S is delivered to the first transmitting/receiving circuit 21 when the control signal Xdrv is at an H level, and the transmitting signal MTX-DT-R is delivered to the second transmitting/receiving circuit 22 when the control signal Xdrv is at an L level.

The master control circuit 23 also comprises third and fourth gate circuits 23e and 23f that alternatively become active according to the control signal Xdrv. The third gate circuit 23e becomes active when the control signal Xdrv is at an L level and takes in a receiving signal MRX-DT-S delivered from the first transmitting/receiving circuit 21. The fourth gate circuit 23f becomes active when the control signal Xdrv is at an H level and takes in a receiving signal MRX-DT-R delivered from the second transmitting/receiving circuit 22.

The receiving signal MRX-DT-S is transmitted from the side of the slave circuit 30 through the first transformer 11 received by the first transmitting/receiving circuit 21 and delivered from the P-channel MOS-FET 21a, and the receiving signal MRX-DT-R is transferred from the side of the slave circuit 30 through the second transformer 12, and received by the second transmitting/receiving circuit 22 and delivered from the P-channel MOS-FET in the second transmitting/receiving circuit 22.

The receiving signal MRX-DT-S or the receiving signal MRX-DT-R passing through the gate circuit 23e or gate circuit 23f passes through an OR circuit 23g and given to a latching and timer circuit 23h. The latching and timer circuit 23h latches the receiving signal MRX-DT-S as a set signal and the receiving signal MRX-DT-R as a reset signal and demodulates an alarm signal ALM indicated by the receiving signals MRX-DT-S and MRX-DT-R. The latching and timer circuit 23h recognizes disappearance of the alarm signal and stops alarm output when the delivery of the receiving signals of MRX-DT-S and MRX-DT-R is interrupted for a predetermined period of time.

The master control circuit 23 thus constructed sets the first transmitting/receiving circuit 21 for transmitting (sending) operation and sets the second transmitting/receiving circuit 22 for receiving operation when the control signal Xdrv is at an H level to perform bi-directional signal transmission to/from the slave circuit 30. Thus, the transmitting signal MTX-DT-S is transmitted through the first transmitting/receiving circuit 21, and the receiving signal MRX-DT-R is received through the second transmitting/receiving circuit 22. The master control circuit 23 sets the first transmitting/receiving circuit 21 for receiving operation and sets the second transmitting/receiving circuit 22 for transmitting operation when the control signal Xdrv is at an L level to perform bi-directional signal transmission to/from the slave circuit 30. Thus, the transmitting signal MTX-DT-R is transmitted through the second transmitting/receiving circuit 22, and the receiving signal MRX-DT-S is received through the first transmitting/receiving circuit 21. Therefore, the master control circuit 23 changes over the functions of the first transmitting/receiving circuit 21 and the second transmitting/receiving circuit 22 alternatively for transmitting operation and for receiving operation according to the control signal to perform bi-directional communication to/from the slave circuit 30.

Figure 5:
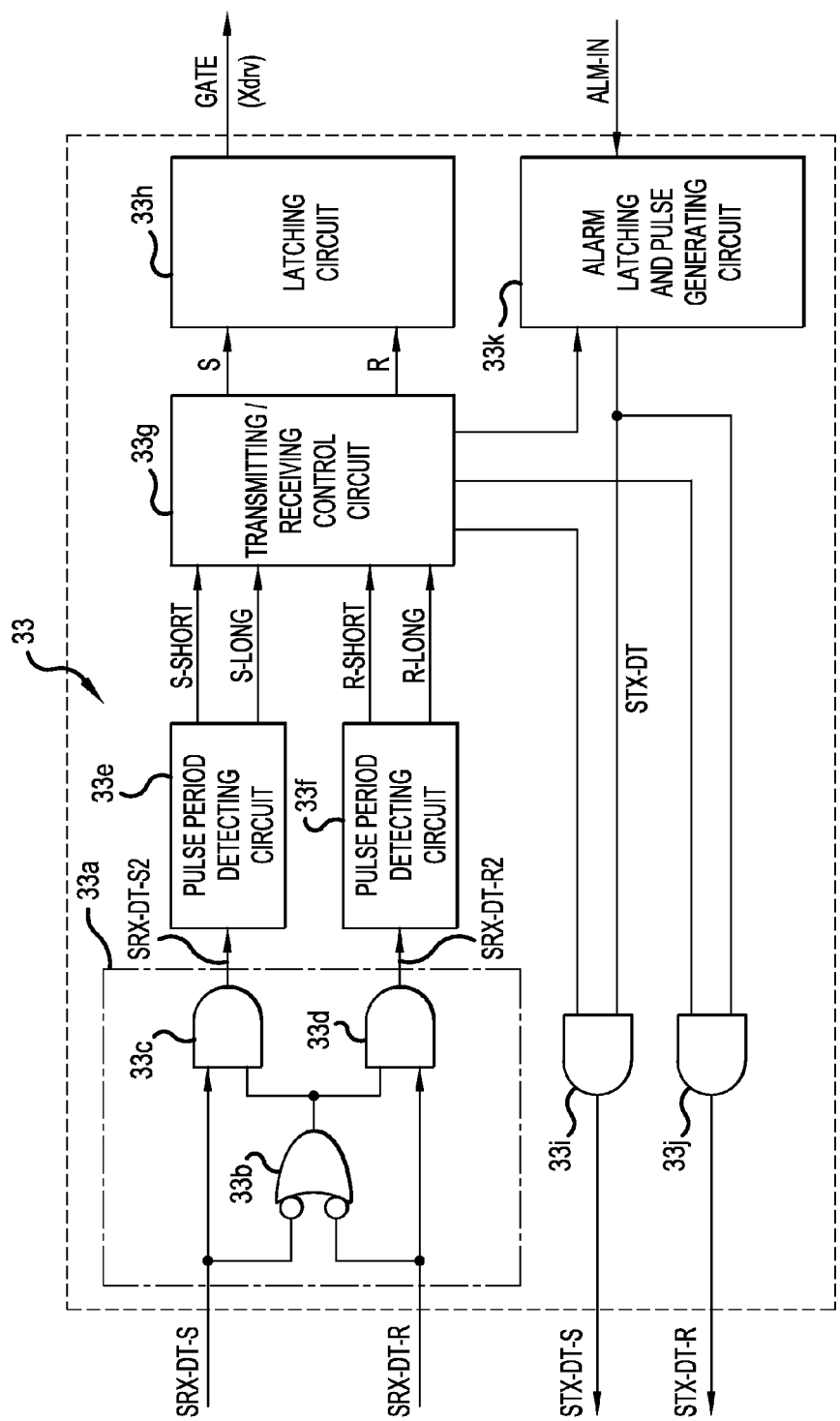
FIG. 5 shows an example of construction of a slave control circuit in the signal transmission device of FIG. 2.

FIG. 5 shows an example of construction of the slave control circuit 33. The slave control circuit 33 comprises a common-mode input rejection circuit (common-mode noise filter) 33a that receives the receiving signals SRX-DT-S and SRX-DT-R delivered from the third and fourth transmitting/receiving circuits 31 and 32, respectively. The common-mode input rejection circuit 33a is composed for example, of a NAND circuit 33b that receives and inverts the receiving signals SRX-DT-S and SRX-DT-R and two gate circuits 33c and 33d that are gate-controlled by the NAND circuit 33b.

The common-mode input rejection circuit 33a rejects the receiving signals MRX-DT-S and MRX-DT-R as noises by making both the gate circuits 33c and 33d inactive with the output of the NAND circuit 33b if the receiving signals SRX-DT-S and SRX-DT-R are given at the same time, which means that both the receiving signals SRX-DT-S and SRX-DT-R are at an H level. If one of the receiving signals SRX-DT-S and SRX-DT-R is at an H level and the other is at an L level, the signals SRX-DT-S and SRX-DT-R are delivered through the gate circuit 33c and 33d, respectively.

The first pulse period detecting circuit 33e for set signal detection and the second pulse period detecting circuit 33f for reset signal detection receive the receiving signals SRX-DT-S and SRX-DT-R, respectively, delivered from the common-mode input rejection circuit 33a. The first pulse period detecting circuit 33e determines the period of the pulse signal composing the receiving signal SRX-DT-S for setting. The first pulse period detecting circuit 33e delivers a first period detecting signal S-SHORT upon receiving a pulse signal with a first pulse interval (i.e. a short period) and delivers a second period detecting signal S-LONG upon receiving a pulse signal with a second pulse interval (i.e. a long period).

The second pulse period detecting circuit 33f determines the period of the pulse signal composing the receiving signal SRX-DT-R for resetting. Similarly to the first pulse period detecting circuit 33e, the second pulse period detecting circuit 33f delivers a first period detecting signal R-SHORT upon receiving a pulse signal with the first pulse interval, and delivers a second period detecting signal R-LONG upon receiving a pulse signal with the second pulse interval.

A transmitting/receiving control circuit 33g detects a point of change in the pulse intervals of the transmitting signals MTX-DT-S and MTX-DT-R generated by the master control circuit 23 according to the period detecting signals S-SHORT, S-LONG, R-SHORT, and R-LONG detected by the first and second pulse period detecting circuits 33e and 33f, to obtain receiving signals S and R corresponding to the transmitting signals MTX-DT-S and MTX-DT-R. The transmitting/receiving control circuit 33g controls, using the signals S and R, the latching operation of the latching circuit 33h, which delivers a signal GATE demodulating the control signal Xdrv.

The transmitting/receiving control circuit 33g determines, according to the period detecting signals S-SHORT, S-LONG, R-SHORT, and R-LONG, which of the third and fourth transmitting/receiving circuits 31 and 32 is receiving the signal transferred from the side of the master circuit 20. The transmitting/receiving control circuit 33g sets one of the third and fourth transmitting/receiving circuits 31 and 32 that is not receiving the signal, to a circuit for signal transmission from the slave circuit 30 to the master circuit 20. Corresponding to this setting, gate circuits 33i and 33j are alternatively made active.

The gate circuits 33i and 33j delivers signals for the master circuit 20 selectively to the third and fourth transmitting/receiving circuit 31 and 32. The signal for the master circuit 20 is delivered by the alarm latching and pulse generating circuit 33k and is an alarm signal ALM, for example. The alarm latching and pulse generating circuit 33k receives an alarm signal ALM-IN given by the abnormality detecting circuits 8 and 9 and generates a pulse signal STX-DT indicating the alarm signal ALM-IN synchronously with the pulse signal given by the transmitting/receiving control circuit 33g. The pulse signal STX-DT passes selectively through the gate circuit 33i or 33j and delivered to the circuit set for transmitting operation, which is either one of the third transmitting/receiving circuits 31 and 32, as a signal, which is either one of the transmitting signals STX-DT-S and STX-DT-R, the former going to the circuit 31 and the latter to the circuit 32.

The slave control circuit 33 having the construction described above demodulates the control signal Xdrv that is given by the master circuit 20 to the slave circuit 30, based on the receiving signals SRX-DT-S and SRX-DT-R that are received through the third and fourth transmitting/receiving circuits 31 and 32, respectively. At the same time, the slave control circuit 33, using either one circuit that is not used for receiving the signal, of the third and fourth transmitting/receiving circuits 31 and 32, transmits the alarm signal ALM generated in the side of the slave circuit 30 toward the master circuit 20. Thus, the slave control circuit 33, as well as the master control circuit 23, performs simultaneous bi-directional signal transmission between the master circuit 20 and the slave circuit 30 through the first and second transformers 11 and 12.

Figure 6:
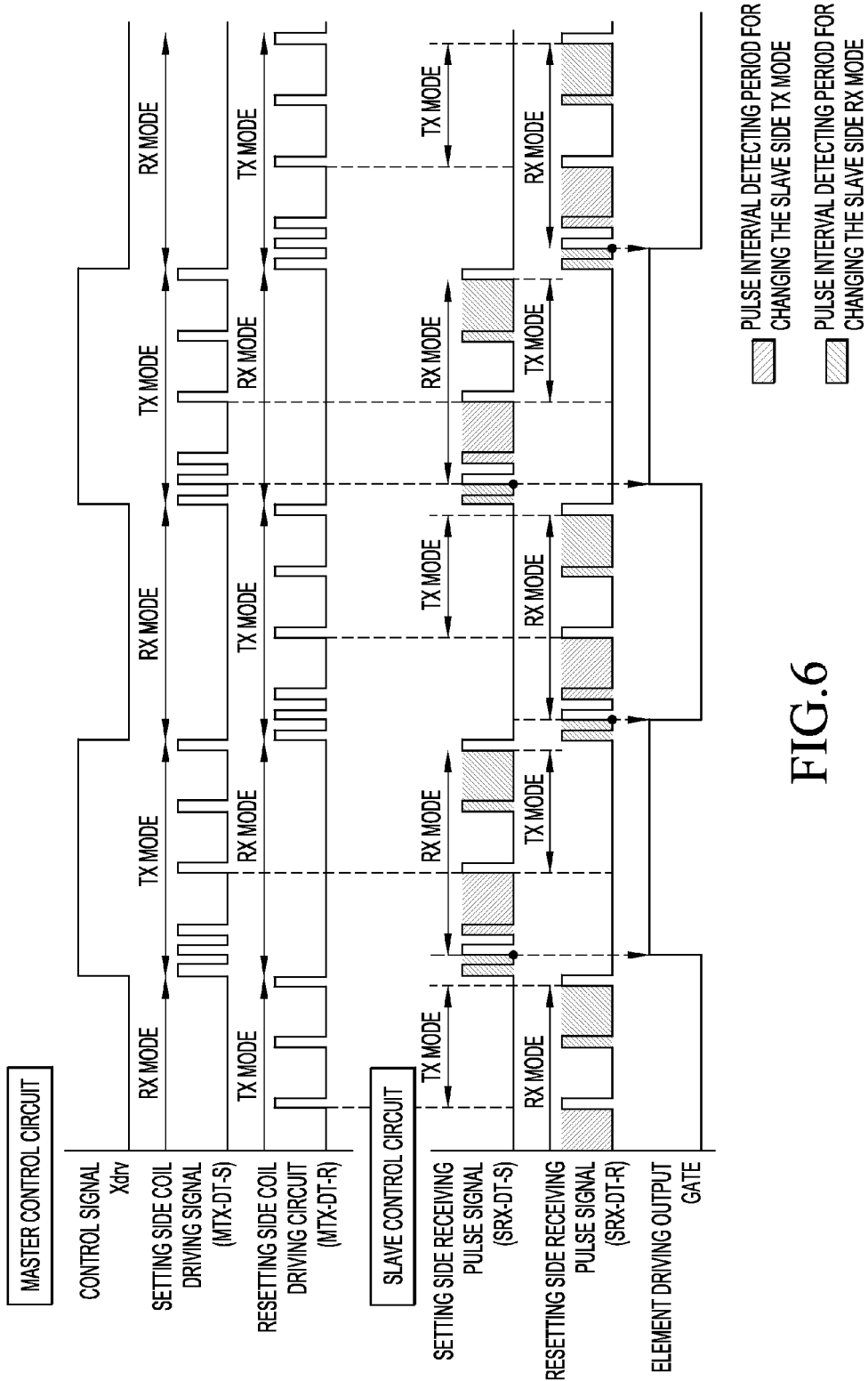
FIG. 6 is an operational timing chart illustrating a basic operation mode for transmitting a control signal from the master control circuit to the slave control circuit in the signal transmission device of FIG. 2.

Now operation of the simultaneous bi-directional signal transmission in the signal transmission device with the construction described above will be described in the following with reference to the operational timing charts of FIG. 6 and FIG. 7. FIG. 6 shows the basic operation of the signal transmission device in the signal transmission from the master circuit 20 to the slave circuit 30. It is assumed here that the signal to be transmitted from the master circuit 20 to the slave circuit 30 is a control signal Xdrv of a square wave repeating high H and low L levels with a specified period, for example, as shown in FIG. 6.

The master control circuit 23 having the construction shown in FIG. 4, detecting the leading edge and the falling edge of the control signal Xdrv, generates a pulse signal with a first pulse interval (a short period) (consisting of three pulses in this example) for a predetermined period of time and then generates another pulse signal with a second pulse interval (a long period). In a period of the control signal Xdrv at an H level, a transmitting signal MTX-DT-S for setting is delivered to transmission-drive the first transmitting/receiving circuit 21. In a period of the control signal Xdrv at an L level, a transmitting signal MTX-DT-R for resetting is delivered to transmission-drive the second transmitting/receiving circuit 22.

Thus, the first transmitting/receiving circuit 21 is set for transmission (a TX mode) in the period receiving the transmitting signal MTX-DT-S. In this period, the other circuit, the second transmitting/receiving circuit 22, is set for receiving (an RX mode). This second transmitting/receiving circuit 22 is set, in the period receiving the transmitting signal MTX-DT-R, for transmission (a TX mode). In this latter period, the other circuit, the first transmitting/receiving circuit 21, is set for receiving operation (an RX mode)

In other words, in the period of the control signal Xdrv at an H level, the first transmitting/receiving circuit 21 is set for transmitting operation (a TX mode) and the second transmitting/receiving circuit 22 is set for receiving operation (an RX mode). In this period, the transmitting signal MTX-DT-S is transmitted through the first transmitting/receiving circuit 21. In the period of the control signal Xdrv at an L level, the first transmitting/receiving circuit 21 is set for receiving operation (an RX mode) and the second transmitting/receiving circuit 22 is set for transmitting operation (a TX mode). In this period, the transmitting signal MTX-DT-R is transmitted through second transmitting/receiving circuit 22.

On the other hand, the slave control circuit 33, which receives the signal transferred from the side of the master circuit 20, determines which of the third and fourth transmitting/receiving circuits is receiving the signal as shown in FIG. 6. More specifically, the transmitting/receiving control circuit 33g determines which of the transmitting/receiving circuits 31 and 32 is receiving the signal based on the period detecting signals S-SHORT, S-LONG, R-SHORT, and R-LONG detected in the pulse period detecting circuits 33e and 33f.

The first pulse period detecting circuit 33e determines the period of the pulse signal of the receiving signal SRX-DT-S received at the third transmitting/receiving circuit 31, which is set for receiving operation. When the period of the pulse signal has the first interval, the first pulse period detecting circuit 33e detects the pulse signal as the leading edge of the control signal Xdrv and delivers the period detecting signal S-SHORT. After that, when the period of the pulse signal of the receiving signal SRX-DT-S changes to have the second interval, the first pulse period detecting circuit 33e delivers the period detecting signal S-LONG.

At this time, the transmitting/receiving control circuit 33g, detecting the period detecting signal S-LONG, sets the fourth transmitting/receiving circuit 32 for transmitting operation (a TX mode). After that, the transmitting/receiving control circuit 33g, monitoring the period detecting signals S-SHORT and S-LONG, watches whether the interval of the pulse signal of the receiving signal SRX-DT-S changes to the first pulse interval again or not.

When the interval of the pulse signal of the receiving signal SRX-DT-R is the first pulse interval, the second pulse period detecting circuit 33f identifies this signal as the falling edge of the control signal Xdrv and delivers the period detecting signal R-SHORT. Detecting the period detecting signal R-SHORT, the transmitting/receiving control circuit 33g sets the fourth transmitting/receiving circuit 32 for receiving operation (an RX mode).

When the interval of the pulse signal of the receiving signal SRX-DT-R has changed to the second interval and the second pulse period detecting circuit 33f delivers the period detecting signal R-LONG, the transmitting/receiving control circuit 33g sets the third transmitting/receiving circuit 31 for transmitting operation (a TX mode). After that, the transmitting/receiving control circuit 33g monitors the period detecting signals R-SHORT and R-LONG and watches whether or not the interval of the pulse signal of the receiving signal SRX-DT-R changes to the first pulse interval again.

In addition to the processing described above, the transmitting/receiving control circuit 33g sets and resets the latching circuit 33h according to the period detecting signals S-SHORT and R-SHORT delivered from the third and fourth pulse period detecting circuits 33e and 33f, respectively. More specifically, the latching circuit 33h is set upon detection of the period detecting signal S-SHORT, and reset upon detection of the period detecting signal R-SHORT. As a result, the latching circuit 33h delivers a set output signal GATE that is the demodulated control signal Xdrv. This output signal GATE is delivered to the high side driver circuit 4 that ON-drives the first switching element Q1.

The master circuit 20 of the signal transmission device of the embodiment transmits, according to the control signal Xdrv, the transmitting signal MTX-DT-S indicating a leading edge of the control signal Xdrv through the first transformer 11 to the side of the slave circuit 30, and transmits the transmitting signal MTX-DT-R indicating a falling edge of the control signal Xdrv through the second transformer 12 to the side of the slave circuit 30. The slave circuit 30 of the signal transmission device detects the receiving signal SRX-DT-S received through the first transformer 11 and the receiving signal SRX-DT-R received through the second transformer 12 and demodulates the control signal Xdrv as the output signal GATE.

Figure 7:
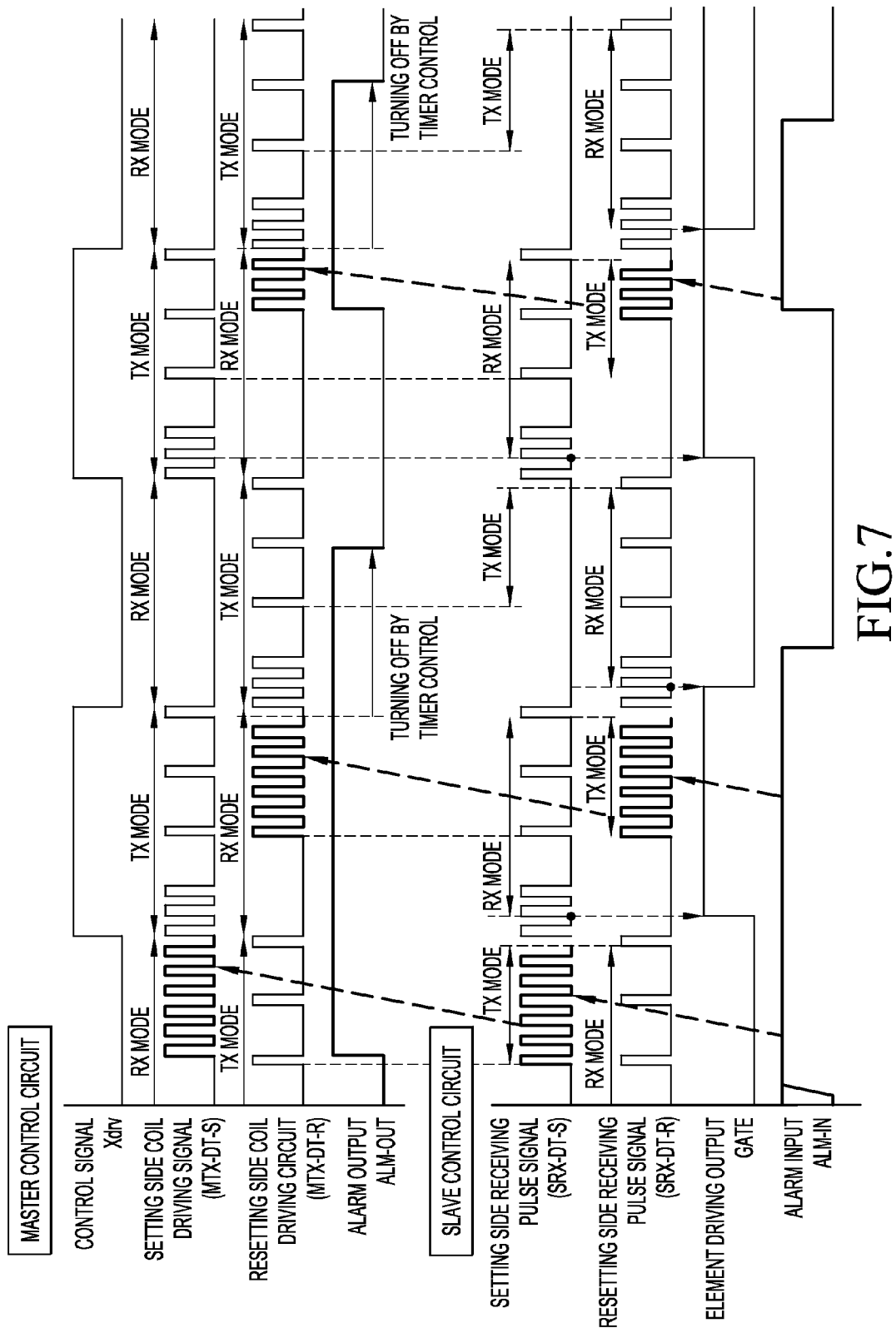
FIG. 7 is an operational timing chart illustrating an operation mode for transmitting a control signal from the slave control circuit to the master control circuit as well as the basic operation mode of FIG. 6 in the signal transmission device of FIG. 2.

The alarm signal ALM is transmitted from the slave circuit 30 to the master circuit 20 in the way as shown by the operational timing chart of FIG. 7.

When an alarm signal ALM-IN at an H level is given to the slave circuit 30, the latching and pulse generating circuit 33k generates a pulse signal having a pulse interval approximately equal to the first interval. This pulse signal indicated with a thick line in FIG. 7 is transmitted through the gate circuit 33i or 33j to either one that is set for transmitting operation (TX mode) of the third and fourth transmitting/receiving circuits 31 and 32, and then transmitted to the master control circuit 23. Upon disappearance (change into an L level) of the alarm signal ALM-IN, the latching and pulse generating circuit 33k stops delivering the pulse signal and the transmission of the pulse signal to the master control circuit 23 accordingly stops.

The master control circuit 23 always monitors the receiving signals MRX-DT-S and MRX-DT-R from the first and second transmitting/receiving circuits 21 and 22, either one of which is set for receiving operation (RX mode). Detecting the pulse signal of the receiving signal of MRX-DT-S or MRX-DT-R, the master control circuit 23 receives the signal as delivery of the alarm signal ALM-IN and sets the latching and timer circuit 23h to change the alarm output ALM-OUT into an H level. Detecting disappearance of the pulse signal of the receiving signal MRX-DT-S or MRX-DT-R from the first or second transmitting/receiving circuit 21 or 22 that is set for receiving operation (RX mode), the master control circuit 23 detects absence of the signal for a predetermined period of time by the timer in the latching and timer circuit 23h and resets the circuit 23h to change the alarm output ALM-OUT into an L level.

Thus, the alarm signal ALM-IN is demodulated by setting and resetting of the latching and timer circuit 23h based on the receiving signals MRX-DT-S and MRX-DT-R. The alarm signal ALM is transmitted from the slave circuit 30 to the master circuit 20 simultaneously with the transmitting the control signal Xdrv from the master circuit 20 to the slave circuit 30, performing bi-directional signal transmission.

In the basic operation described above the master control circuit 23 detects the leading and falling edges of the control signal Xdrv and delivers a pulse signal with a first interval for a specified period of time, and then delivers another pulse signal with a second interval. The first transmitting/receiving circuit 21 is set for transmitting operation at the timing of the leading edge of the control signal Xdrv and signal transmission is conducted through the first transformer 11; and the second transmitting/receiving circuit 22 is set for transmitting operation at the timing of the falling edge of the control signal Xdrv and signal transmission is conducted through the second transformer 12.

Figure 8:
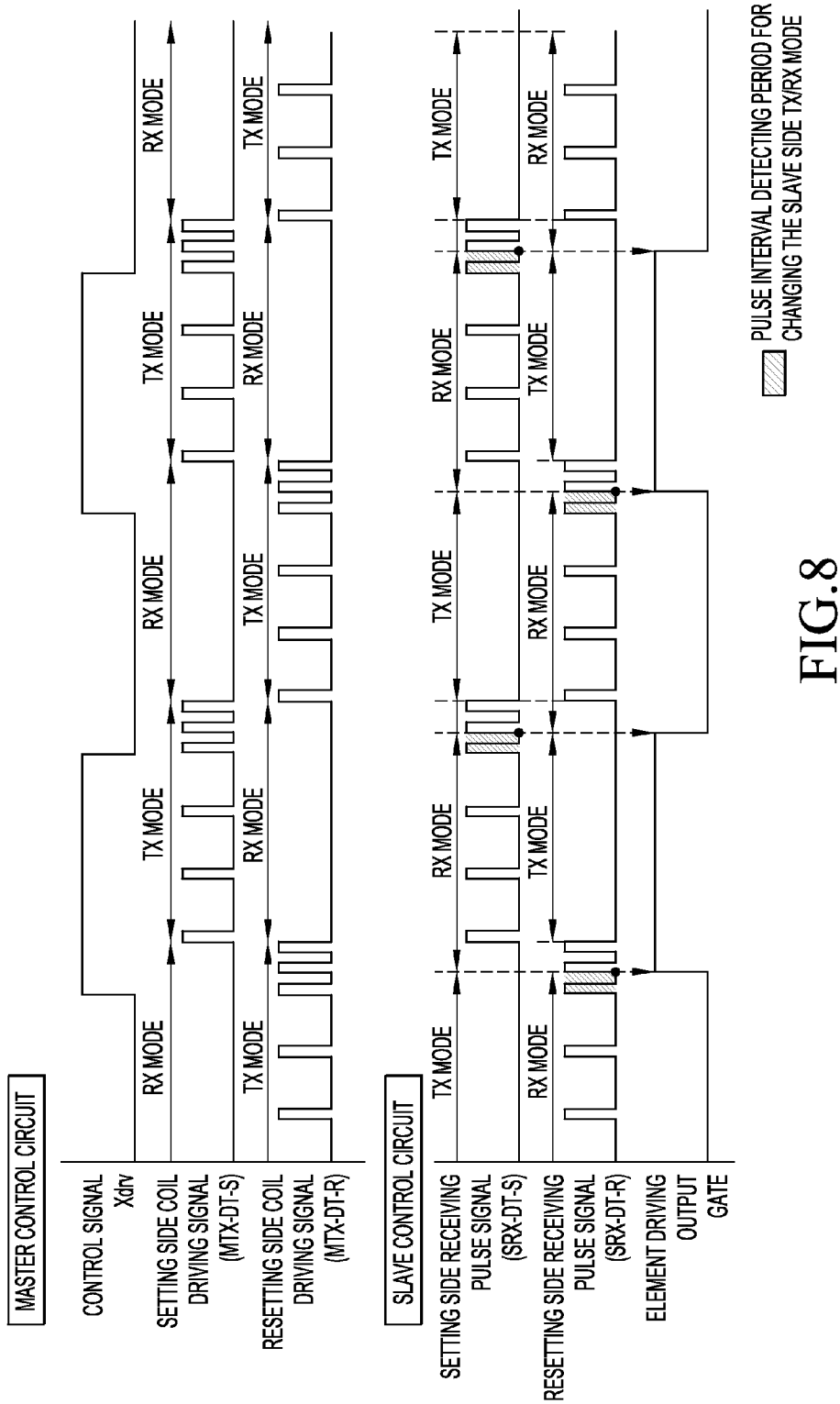
FIG. 8 is an operational timing chart illustrating another operation mode for transmitting a control signal from the master control circuit to the slave control circuit in the signal transmission device of FIG. 2.

However, as shown by the operational timing chart in FIG. 8, a transmitting signal generated can be a pulse signal having a second pulse interval (i.e. long period). Upon detecting the leading edge and falling edge of the control signal Xdrv, the pulse signal changes to the one having the first pulse interval (i.e. short period). This operation mode, which is different from the one described earlier, changes over the first and second transmitting/receiving circuits 21 and 22 into the TX mode for transmitting operation or into the RX mode for receiving operation upon detecting the pulse signal (specifically the third pulse wave in the example shown in FIG. 8) having the first interval (i.e. short period).

In the slave control circuit 33, the pulse period detecting circuits 33e and 33f determine the period of pulse signal composing the signals SRX-DT-S and SRX-DT-R received through either one of the third and fourth transmitting/receiving circuits 31 and 32. When the interval of the pulse signal of the signal SRX-DT-R received through the fourth transmitting/receiving circuit 32 becomes the first pulse interval (i.e. short period), the slave control circuit 33 sets the third transmitting/receiving circuit 31 for receiving operation (i.e. RX mode) and detects turning to an H level of the control signal Xdrv. After that, the transmitting/receiving control circuit 33g detects that the interval of the pulse signal of the signal SRX-DT-S received through the third transmitting/receiving circuit 31 has changed over to the first pulse interval (i.e. short period), and sets the fourth transmitting/receiving circuit 32 for receiving operation (i.e. RX mode) and detects turning to an L level of the control signal Xdrv.

Thus, in the operation mode of FIG. 8, the slave control circuit 33 only needs to check whether or not the interval of the pulse signal of the signals SRX-DT-S and SRX-DT-R received through the third and fourth transmitting/receiving circuits 31 and 32 has become the first pulse interval (i.e. short period) in order to change over the third and fourth transmitting/receiving circuits 31 and 32 for transmitting operation (i.e. TX mode) or for receiving operation (i.e. RX mode). Therefore, the slave control circuit 33 readily performs control process thereof.

In the operation of the signal transmission device 10 in this operation mode as well as the basic operation mode described previously, the control signal Xdrv is transmitted from the master circuit 20 to the slave circuit 30 by means of the signals MTX-DT-S and MTX-DT-R that indicates the leading edge and falling edge, and the control signal Xdrv is demodulated from the received signals SRX-DT-S and SRX-DT-R to obtain the output signal GATE.

Figure 9:
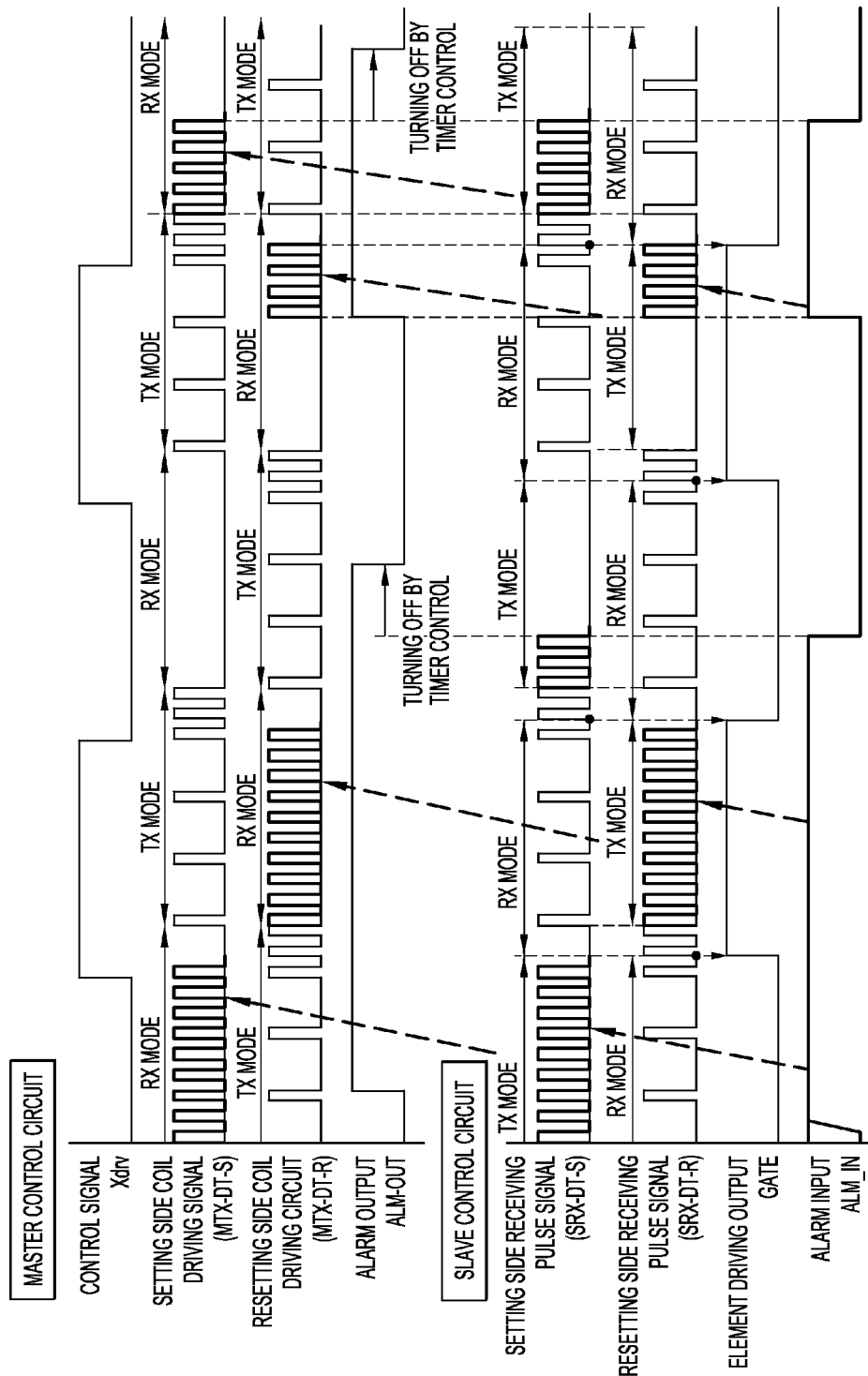
FIG. 9 is an operational timing chart illustrating an operation mode for transmitting a control signal from the slave control circuit to the master control circuit as well as the basic operation mode of FIG. 8 in the signal transmission device of FIG. 2.

In this operation mode, transmission of the alarm signal ALM is carried out from the slave circuit 30 to the master circuit 20 in the way, for example, shown by the operational timing chart of FIG. 9. When the alarm signal ALM-IN at an H level is given to the slave circuit 30, the latching and pulse generating circuit 33k generates a pulse signal having a pulse interval approximately equal to the first pulse interval. This pulse signal indicated by the thick line in FIG. 9 is delivered through the gate circuit 33i and 33j, to one of the third and fourth transmitting/receiving circuits 31 and 32 that is set for transmitting operation (i.e. TX mode). From the third or fourth transmitting/receiving circuit 31 or 32, the signal is transferred to the master control circuit 23. When the alarm signal ALM-IN has disappeared (i.e. turning into an L level), the latching and pulse generating circuit 33k stops generating the pulse signal, and the delivery of the pulse signal from the latching and pulse generating circuit 33k stops as well.

In this case too, similarly to the case of the basic operation mode described previously referring to FIG. 7, the slave circuit 30 transmits the pulse signals of the transmitting signals STX-DT-S and STX-DT-R indicating the alarm signal ALM-IN through the third and fourth transmitting/receiving circuits 31 and 32 set for transmitting operation (i.e. TX mode) toward the master circuit 20 simultaneously with the transmission of the transmitting signals MTX-DT-S and MTX-DT-R from the master circuit 20 to the slave circuit 30.

The master control circuit 23, similarly to the case of the basic embodiment described previously, always monitors the receiving signals MRX-DT-S and MRX-DT-R through the first and second transmitting/receiving circuits 21 and 22. Detecting the pulse signal indicating the receiving signals MRX-DT-S and MRX-DT-R, the master control circuit 23 identifies the pulse signal as receiving the alarm signal ALM-IN and sets the latching and timer circuit 23h. When the receiving pulse signal through transmitting/receiving circuits 21 and 22 that have been set for receiving operation (i.e. RX mode) is absent for a predetermined period of time, the master control circuit 23 detects the absence by a timer therein and identifies as disappearance of the alarm signal ALM-IN and resets the latching and timer circuit 23h. According to the setting and resetting, the latching and timer circuit 23h delivers a set output, the alarm output ALM-OUT that is the demodulated alarm signal ALM-IN. Thus, in the operation mode shown in FIGS. 8 and 9, too, similarly to the basic operation mode described previously, simultaneous transmission of alarm signal ALM is performed from the slave circuit 30 to the master circuit 20.

Thus, both in the case of signal transmission with the operational timings as shown in FIGS. 6 and 7 and in the case of signal transmission with the operational timings as shown in FIGS. 8 and 9, the signal transmission device 10 performs simultaneous bi-directional signal transmission of the control signal Xdrv and the alarm signal ALM between the master circuit 20 and the slave circuit 30. Therefore, the signal transmission device of the embodiment of the invention does not need two individual signal transmission devices in the opposite direction, which is the case for the signal transmission devices disclosed in Patent Documents 1, 2, 3. Moreover, the master circuit 20 only controls the direction of the signal transmission through the first and second transformers 11 and 12 allowing simple control without a complicated construction of the device.

Now the following describes some preferred examples of specific construction of the master control circuit 23 and the slave control circuit 33 for bi-directional signal transmission between the master circuit 20 and the slave circuit 30 with the operational timings as shown in FIG. 6 and FIG. 7.

Figure 10:
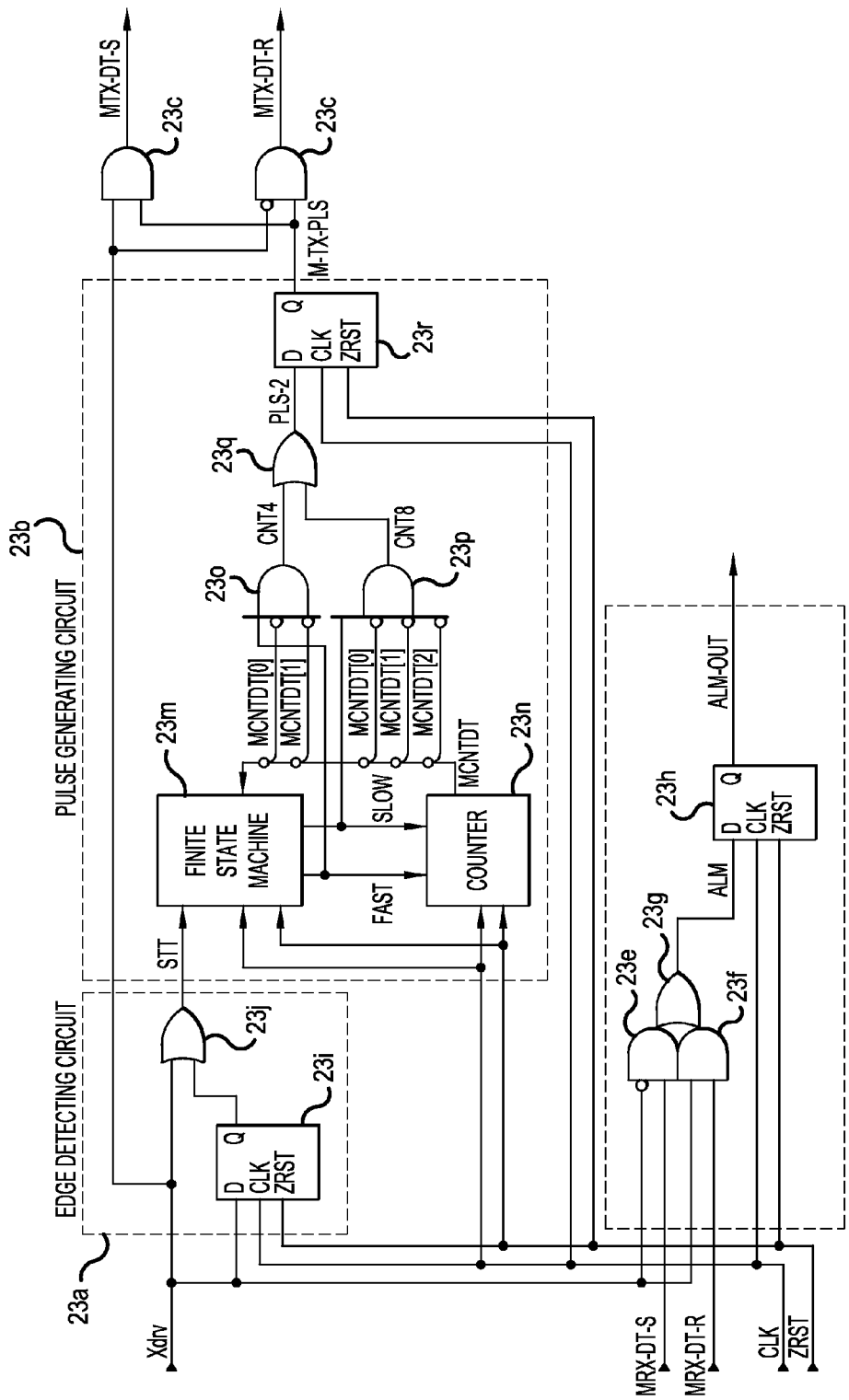
FIG. 10 shows an example of specific construction of the master control circuit of FIG. 4.
Figure 11:
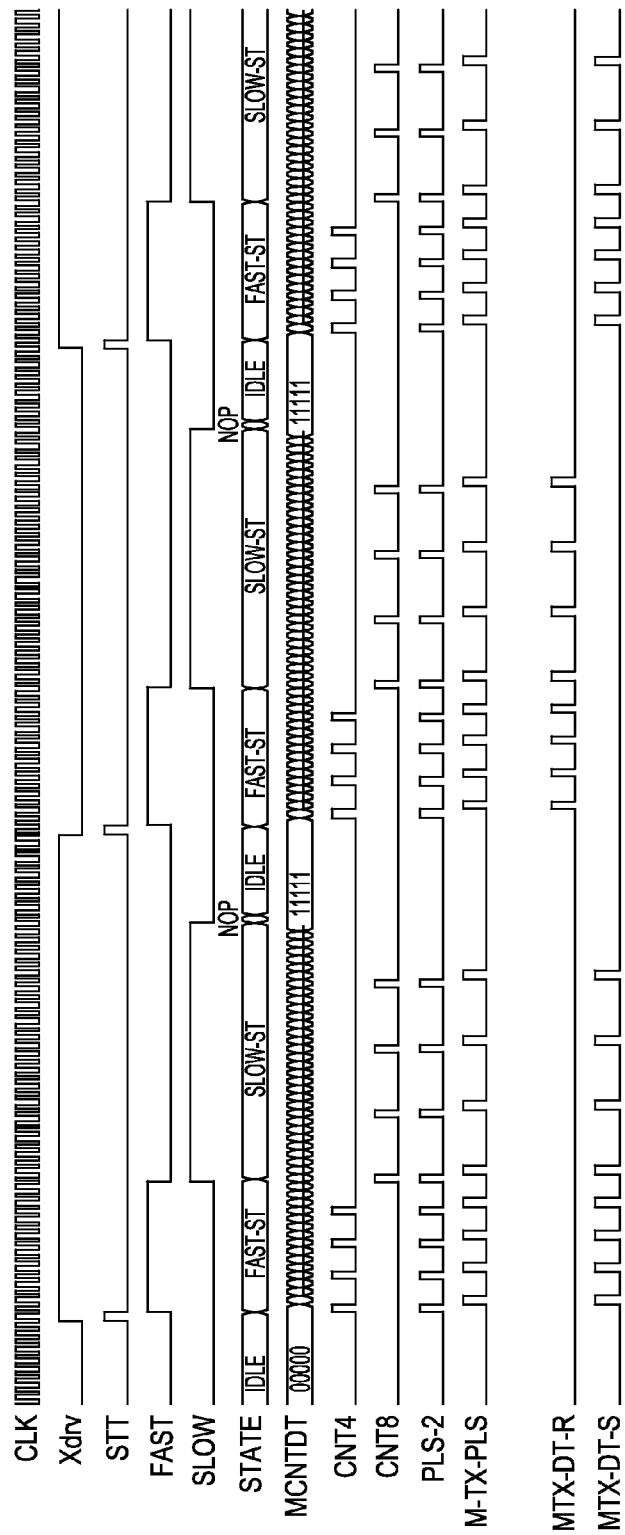
FIG. 11 is an operation timing chart of the master control circuit shown in FIG. 10.

FIG. 10 shows an example of specific construction of the master control circuit 23 shown in FIG. 4. The edge detecting circuit 23a as shown in FIG. 10 is composed of a D flip-flop 23i that takes in the control signal Xdrv according to a clock pulse CLK and an exclusive OR circuit 23j that executes exclusive logical sum operation of the output of the D flip-flop 23i and the control signal Xdrv. The D flip-flop 23i takes in the control signal Xdrv at the timing of leading edge of the clock pulse CLK. Utilizing the output of the D flip-flop 23i, the edge detecting circuit 23a obtains the exclusive OR of the output of the D flip-flop 23i and the control signal Xdrv in the exclusive OR circuit 23j and delivers the signal STT indicating the leading and falling edges of the control signal Xdrv as shown in FIG. 11.

The pulse generating circuit 23b in the master control circuit 23 comprises a finite state machine 23m, operation of which is controlled receiving the clock pulse CLK and a reset signal ZRST. The finite state machine 23m receives the signal STT and delivers a control signal FAST for generating a pulse signal with a first pulse interval and a control signal SLOW for generating a pulse signal with a second pulse interval corresponding to the number counted by a counter 23n. The operation of the counter 23n is controlled receiving the control signals FAST and SLOW; the counter 23n counts the first pulse interval corresponding to the clock pulse CLK receiving the control signal FAST, and counts the second pulse interval corresponding to the clock pulse CLK receiving the control signal SLOW.

Figure 12:
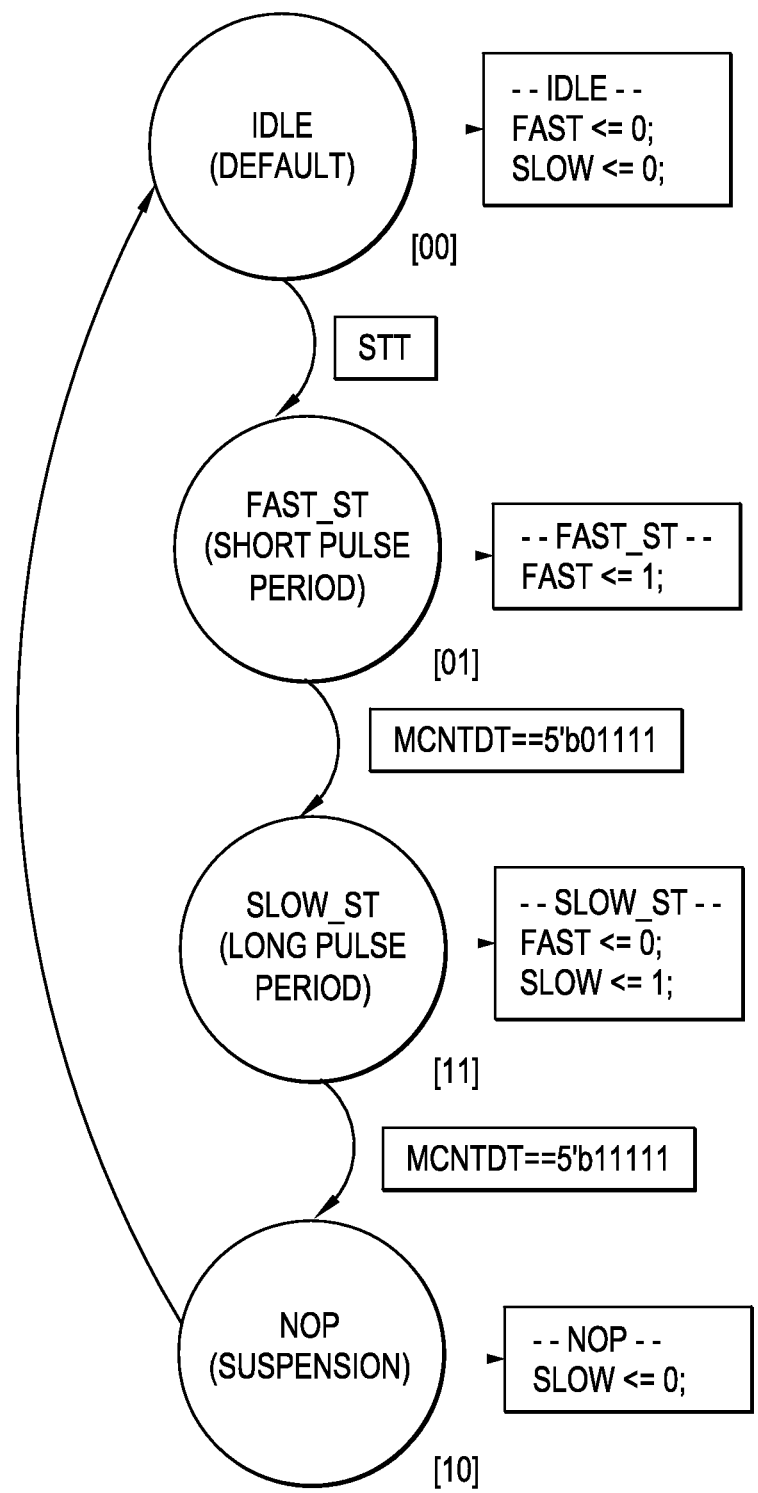
FIG. 12 is a state transition diagram of the finite state machine in the master control circuit shown in FIG. 10.

FIG. 12 is a state transition diagram of the finite state machine 23m. Receiving the signal STT in a default state IDLE, the finite state machine 23m transitions to a fast counting state FAST-ST. This transition of state causes the finite state machine 23m to deliver the control signal FAST and the counter 23n to start counting from the binary value '00000'. When the number of count MCNTDT by the counter 23n reaches the binary value '01111', for example, the state transitions to a slow counting state SLOW-ST.

Upon this transition of state, the finite state machine 23m stops delivering the control signal FAST and starts delivering the control signal SLOW in place of the control signal FAST. At this moment, the counter 23n starts counting again from the binary value '00000'. When the number of count MCNTDT by the counter 23n reaches the binary value '11111', for example, the finite state machine 23m transitions to a non-operating state NOP and stops delivering the control signal SLOW. Then receiving the next clock pulse CLK, the finite state machine 23m returns to the default state IDLE.

The number of count MCNTDT by the counter 23n is delivered to AND circuits 23o and 23p. The AND circuit 23o delivers a signal CNT4 when the lower two bits of the output of the counter 23n is '00' under the condition of the control signal FAST at an H level. Consequently, the AND circuit 23o delivers the signals CNT4 with the short period (with the first interval) four times every time the counter 23n counts four clock pulses CLK as shown in FIG. 11 until the number of count MCNTDT by the counter 23n reaches the binary value '01111'.

The AND circuit 23p delivers CNT8 when the lower three bits of the output of the counter 23n is '000' under the condition of the control signal SLOW at an H level. Consequently, the AND circuit 23p delivers the signals CNT8 with the long period (with the second interval) four times every time the counter 23n counts eight clock pulses CLK as shown in FIG. 11 until the number of count MCNTDT by the counter 23n reaches the binary value '11111'.

The signals CNT4 and CNT8 delivered through the AND circuits 23o and 23p, respectively, are given through an OR circuit 23q to a D flip-flop 23r. This D flip-flop 23r takes in the signals CNT4 and CNT8 corresponding to the clock pulse CLK and delivers four pulses of output signals with the first pulse interval (with a short period) and subsequent four pulses of output signals with the second pulse interval (with a long period). In this way, the pulse signal from the D flip-flop 23r is given to the gate circuits 23c and 23d, which in turn delivers the transmitting signals MTX-DT-S and MTX-DT-R described previously.

Figure 13:
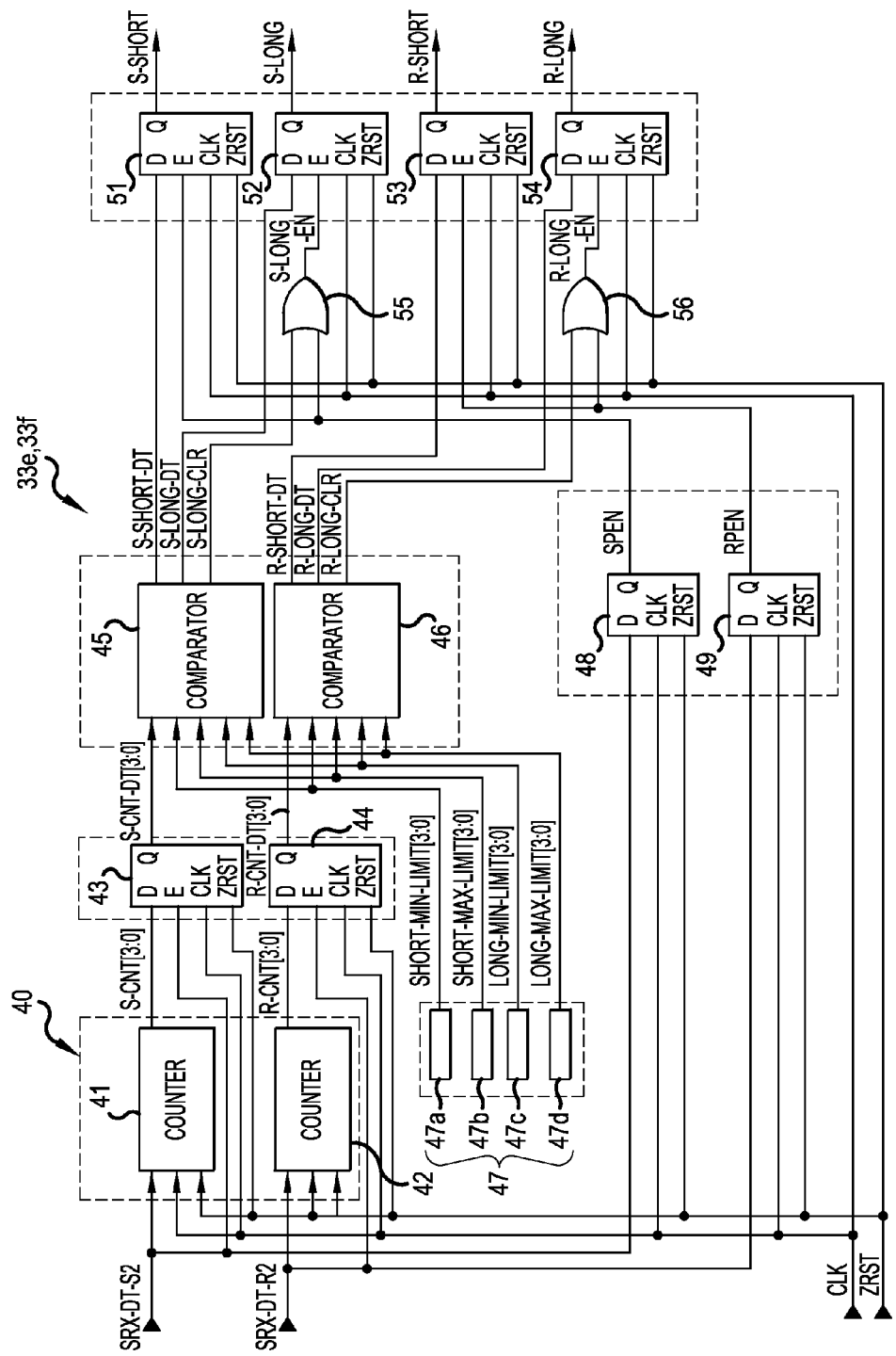
FIG. 13 shows an example of specific construction of the pulse period detecting circuit shown in FIG. 5.

The pulse period detecting circuits 33e and 33f in the slave control circuit 33 shown in FIG. 5 are constructed specifically as shown in FIG. 13. The pulse period detecting circuit shown in FIG. 13 is basically constructed of the pulse period detecting circuit 33e for setting and the pulse period detecting circuit 33f for resetting in parallel connection and joined into a single body.

The pulse period detecting circuit 33e comprises a counter 41 for setting that receives the pulse signal of the receiving signal SRX-DT-S2 for setting given through the common-mode input rejection circuit 33a and counts the clock pulses CLK to detect the pulse interval of the receiving signal SRX-DT-S2. The pulse period detecting circuit 33f comprises a counter 42 for resetting that receives the pulse signal of the receiving signal SRX-DT-R2 for resetting given through the common-mode input rejection circuit 33a and counts the clock pulses CLK to detect the pulse interval of the receiving signal SRX-DT-R2. The counters 41 and 42 each holds a maximum counting value when the counting value thereof has reached the maximum value until the next receiving signal SRX-DT-S2 or SRX-DT-R2 is given to the counter.

The flip-flops 43 and 44 provided at the stages following the counters 41 and 42 latch the counted values by the counters 41 and 42 and hold the counted values when the receiving signals SRX-DT-S2 and SRX-DT-R2 are each at an H level. The counting values that are counted by the counters 41 and 42 and held in the fillip-flops 43 and 44 are delivered to comparators 45 and 46 and there, are compared with four threshold values SHORT-MIN-LIMIT, SHORT-MAX-LIMIT, LONG-MIN-LIMIT, and LONG-MAX-LIMIT that are preliminarily stored in a threshold value setting device 47 composed of four setting components 47a, 47b, 47c, and 47d.

The threshold value SHORT-MIN-LIMIT regulates the counted values by the counters 41 and 42 and indicating the pulse intervals of the receiving signals SRX-DT-S2 and SRX-DT-R2 at the minimum pulse interval of the first pulse period (i.e. short period), and the threshold value SHORT-MAX-LIMIT regulates at the maximum pulse interval of the first pulse interval. The threshold value LONG-MIN-LIMIT regulates the counted values by the counters 41 and 42 and indicating the pulse intervals of the receiving signals SRX-DT-S2 and SRX-DT-R2 at the minimum pulse interval of the second pulse period (i.e. long period), and the threshold value LONG-MAX-LIMIT regulates at the maximum pulse interval of the second pulse interval.

Figure 14:
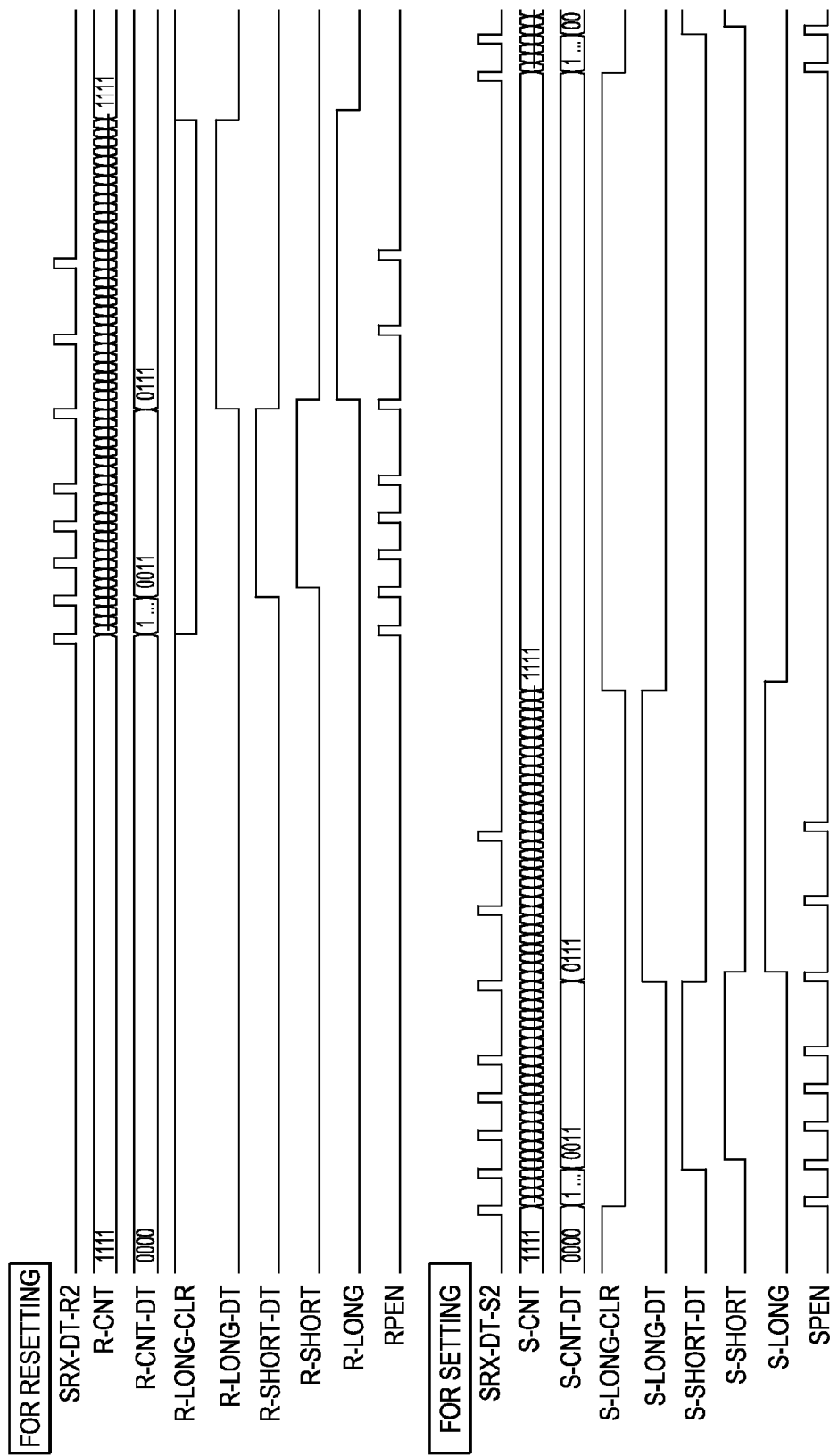
FIG. 14 is an operational timing chart of the pulse period detecting circuit shown in FIG. 13.

When the counted value S-CNT by the counter 41 is in the range from the threshold value SHORT-MIN-LIMIT to the threshold value SHORT-MAX-LIMIT, the comparator 45 delivers a signal S-SHORT-DT showing that the interval of the pulse signal of the receiving signal SRX-DT-S2 is the first pulse interval as shown in the operational timing chart of FIG. 14. When the counted value S-CNT is in the range from the threshold value LONG-MIN-LIMIT to the threshold value LONG-MAX-LIMIT, the comparator 45 delivers a signal S-LONG-DT showing that the interval of the pulse signal of the receiving signal SRX-DT-S2 is the second pulse interval, as shown in the operational timing chart of FIG. 14. When the counted value S-CNT is out of the range specified above, the comparator 45 delivers a signal S-LONG-CLR for clearing the signal S-LONG-DT.

Similarly, when the counted value R-CNT by the counter 42 is in the range from the threshold value SHORT-MIN-LIMIT to the threshold value SHORT-MAX-LIMIT, the comparator 46 delivers a signal R-SHORT-DT showing that the interval of the pulse signal of the receiving signal SRX-DT-R2 is the first pulse interval as shown in the operational timing chart of FIG. 14. When the counted value R-CNT is in the range from the threshold value LONG-MIN-LIMIT to the threshold value LONG-MAX-LIMIT, the comparator 46 delivers a signal R-LONG-DT showing that the interval of the pulse signal of the receiving signal SRX-DT-R2 is the second pulse interval, as shown in the operational timing chart of FIG. 14. When the counted value R-CNT is out of the range specified above, the comparator 46 delivers a signal R-LONG-CLR for clearing the signal R-LONG-DT.

D-flip-flops 48 and 49 take in the receiving signals SRX-DT-S2 and SRX-DT-R2, respectively, upon receiving the clock pulse CLK and delivers enable signals SPEN and RPEN at a timing delayed by one clock pulse as shown in the operational timing chart of FIG. 14. The enable signal SPEN, upon receiving the receiving signal SRX-DT-S2 by the D-flip-flop 48, permits latching operation by the latching circuits 51 and 52 for latching the output signals S-SHORT-DT and S-LONG-DT from the comparator 45. The enable signal RPEN, upon receiving the receiving signal SRX-DT-R2 by the D-flip-flop 49, permits latching operation by the latching circuits 53 and 54 for latching the output signals R-SHORT-DT and R-LONG-DT from the comparator 46.

The latching circuits 52 and 54 receives, in addition to the enable signals SPEN and RPEN, the clearing signals S-LONG-CLR and R-LONG-CLR, respectively, from the comparators 45 and 46 through OR circuits 55 and 56. Thus, when the latching circuits 51 and 53 are set in response to the output signals S-SHORT-DT and R-SHORT-DT, the latching circuits 52 and 54 are reset.

The latching circuits 51, 52, 53, and 54 latch the output signals of the comparators 45 and 46 upon receiving the clock pulse CLK, and delivers the signals S-SHORT and S-LONG indicating the interval of the pulse signal of the receiving signal SRX-DT-S2 and the signals R-SHORT and R-LONG indicating the interval of the pulse signal of the receiving signal SRX-DT-R2 at the timings shown in FIG. 14. These signals S-SHORT, S-LONG, R-SHORT, and R-LONG are delivered to the transmitting/receiving control circuit 33g.

Figure 15:
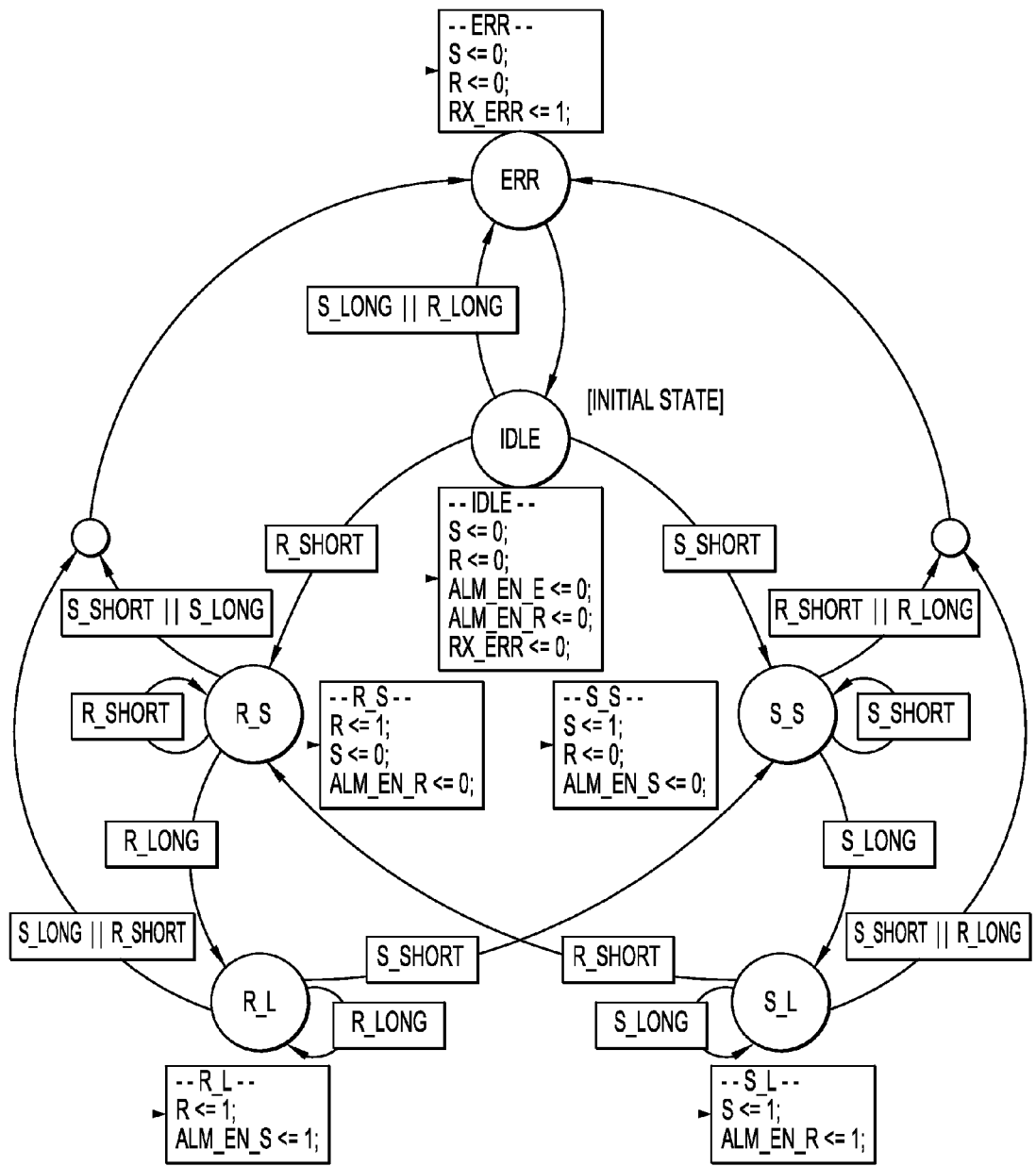
FIG. 15 is a state transition diagram of a finite state machine that constructs the signal transmitting/receiving control circuit indicated in FIG. 5.

The transmitting/receiving control circuit 33g is actualized as a finite state machine circuit that performs the state transition shown in FIG. 15, for example. The transmitting/receiving control circuit 33g, which is a finite state machine circuit, changes the state thereof corresponding to combinations of the signals of S-SHORT, S-LONG, R-SHORT, and R-LONG. Specifically, the transmitting/receiving control circuit 33g transitions among the states of: a default state IDLE of an initial state, a state S-S with a short pulse signal interval for setting, a state S-L with a long pulse signal interval for setting, a state R-S with a short pulse signal interval for resetting, a state R-L with a long pulse signal interval for resetting, and a state ERR, an abnormality detecting state, which does not fall into any of these states.

This transition of states is based on the fact that the signal transmitted from the master circuit 20 is a form of pulse sequence composed of a combination of a pulse signal with a short interval and a pulse signal with a long interval and that the signal changes alternately between for setting and for resetting. The condition for the transition of states is determined so as to correctly trace the pulse sequence. The transmitting/receiving control circuit 33g, which is a finite state machine, normally detects such transition of state as IDLE→S-S→S-L→R-S→R-L→S-S and so on. Thus, a control signal Xdrv is precisely demodulated according to the receiving signals SRX-DT-S2 and SRX-DT-R2.

Figure 16:
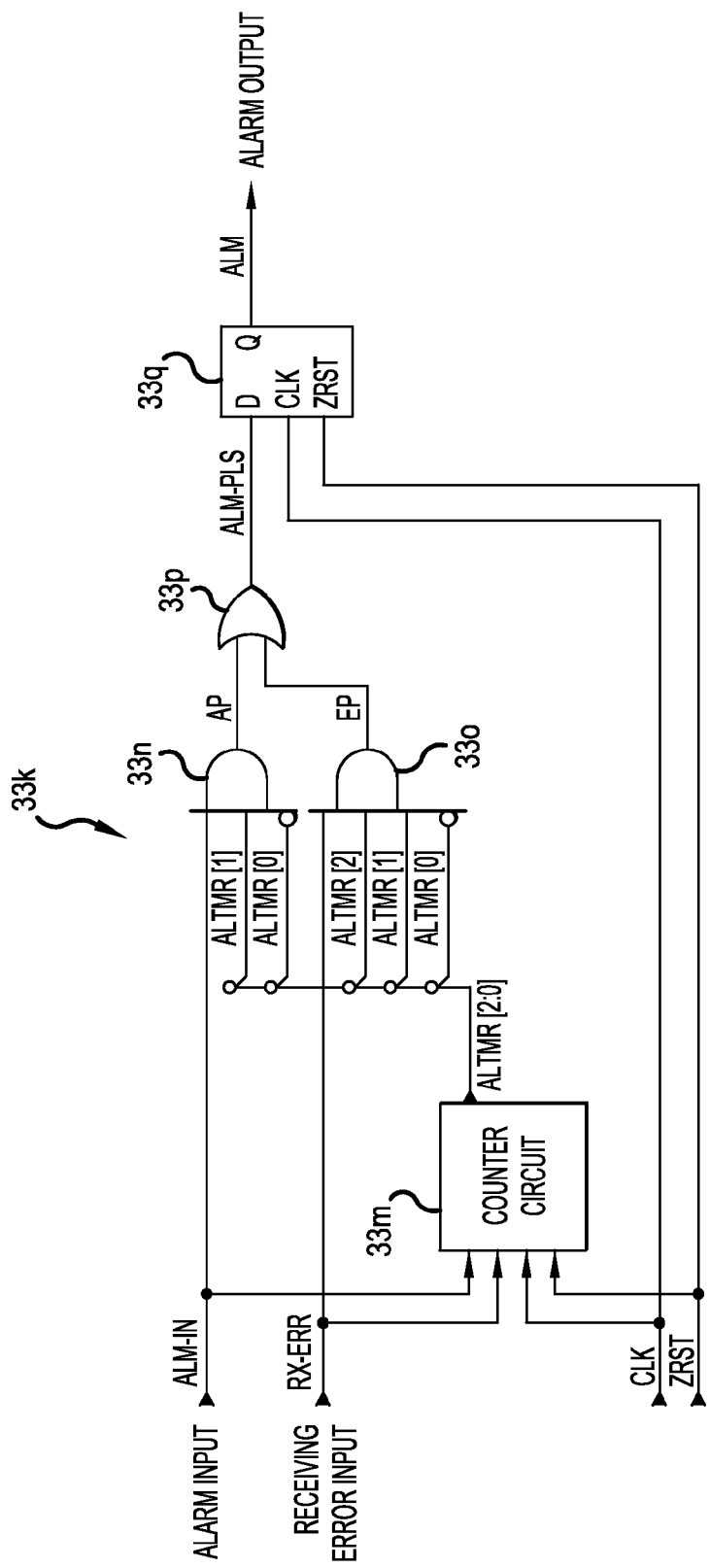
FIG. 16 shows an example of specific construction of the alarm latching and pulse generating circuit 33k.

FIG. 16 shows an example of construction of an alarm latching and pulse generating circuit 33k in the slave control circuit 33. The alarm latching and pulse generating circuit 33k comprises a counter circuit 33m that starts operation receiving an error signal RX-ERR or an alarm signal ALM-IN. The error signal RX-ERR is received when the transmitting/receiving control circuit 33g, which is a finite state machine, detects an abnormality in received signals i.e. the state ERR. The alarm signal ALM-IN is delivered by the abnormality detecting circuit 8 or 9 when the circuit 8 or 9 detects abnormality of the switching element Q1 or Q2.

The counter circuit 33m is a three bit counter, for example, and executes down-counting from binary value '111' set at resetting, receiving the clock pulse CLK. An AND circuit 33n, which receives the alarm signal ALM-IN, delivers a signal AP for transmitting the alarm signal ALM-IN toward the master circuit 20 when the lower two bits of the output data of the counter circuit 33m is binary value '10'. The signal AP is delivered two times in one cycle of the down-counting operation during the period the alarm signal ALM-IN is continuously given.

An AND circuit 33o, which receives the error signal RX-ERR, delivers a signal EP for transmitting the alarm signal ALM toward the master circuit 20 when the three bits of the output data of the counter circuit 33m is binary value '110'. The signal EP is delivered once in one cycle of the down-counting operation during the period the receiving error signal RX-ERR is continuously given.

The signals AP and EP delivered from the AND circuits 33n and 33o, respectively, are transferred through an OR circuit 33p to a D flip-flop 33q and taken in there according to the clock pulse CLK. Consequently, the D flip-flop 33q delivers a pulse signal forming an alarm signal ALM-IN in response to the signal AP that is given twice and the signal EP that is given once in one cycle of the down-counting operation of the counting circuit 33m. The pulse signal of the alarm signal is delivered through the gate circuits 33i and 33j to the third and fourth transmitting/receiving circuits 31 and 32 for transmitting to the master circuit 20.

Figure 17:
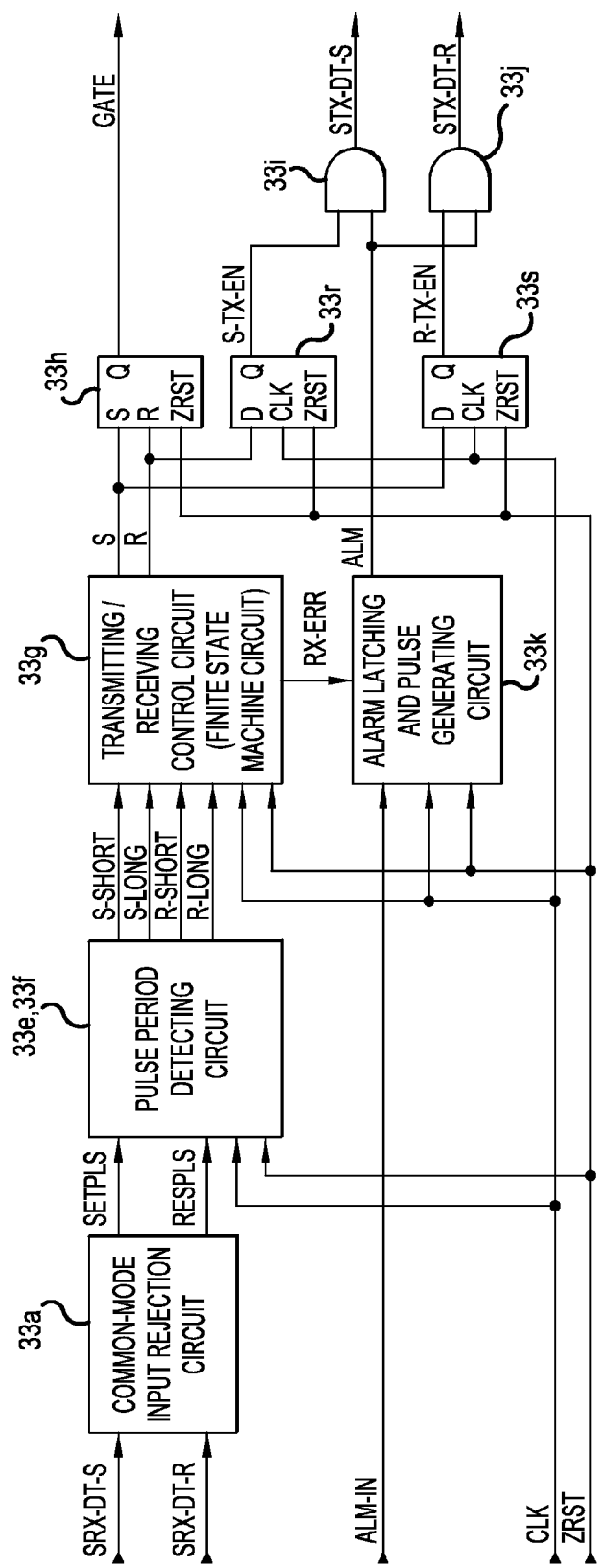
FIG. 17 shows an example of specific construction of a slave control circuit according to another embodiment of the invention.

In the above-described embodiment, the slave control circuit 33 detects the timing of change in the interval of the pulse signals of receiving signals SRX-DT-S and SRX-DT-R from the first pulse interval (i.e. short period) to the second pulse interval (i.e. long period). At this timing of change in the pulse interval, one of the third and fourth transmitting/receiving circuits 31 and 32 is changed over for transmitting operation (i.e. TX mode) to transmit the alarm signal ALM through the gate circuit 33i or 33j. However, another approach is possible for changing over the transmitting/receiving circuit as shown in FIG. 17. Latching circuits 33r and 33s are selectively set utilizing the output of the transmitting/receiving control circuit 33g (a finite state machine circuit) that sets and resets the latching circuit 33h. The set outputs of the latching circuits 33r and 33s are used to control the gate circuits 33i and 33j.

In the slave control circuit having a construction shown in FIG. 17, at the timing of change in the pulse interval of the pulse signals of the receiving signals SRX-DT-S and SRX-DT-R to the first interval (i.e. short period), the gate circuits 33i and 33j are controlled to set one of the third and fourth transmitting/receiving circuits 31 and 32 for transmitting operation (i.e. TX mode). This configuration in FIG. 17 allows setting one of the third and fourth transmitting/receiving circuits 31 and 32 for transmitting operation (TX mode) for longer duration than the previously described embodiment. Thus, the alarm signal ALM-IN can be transmitted stably over a longer period of time.

Figure 18:
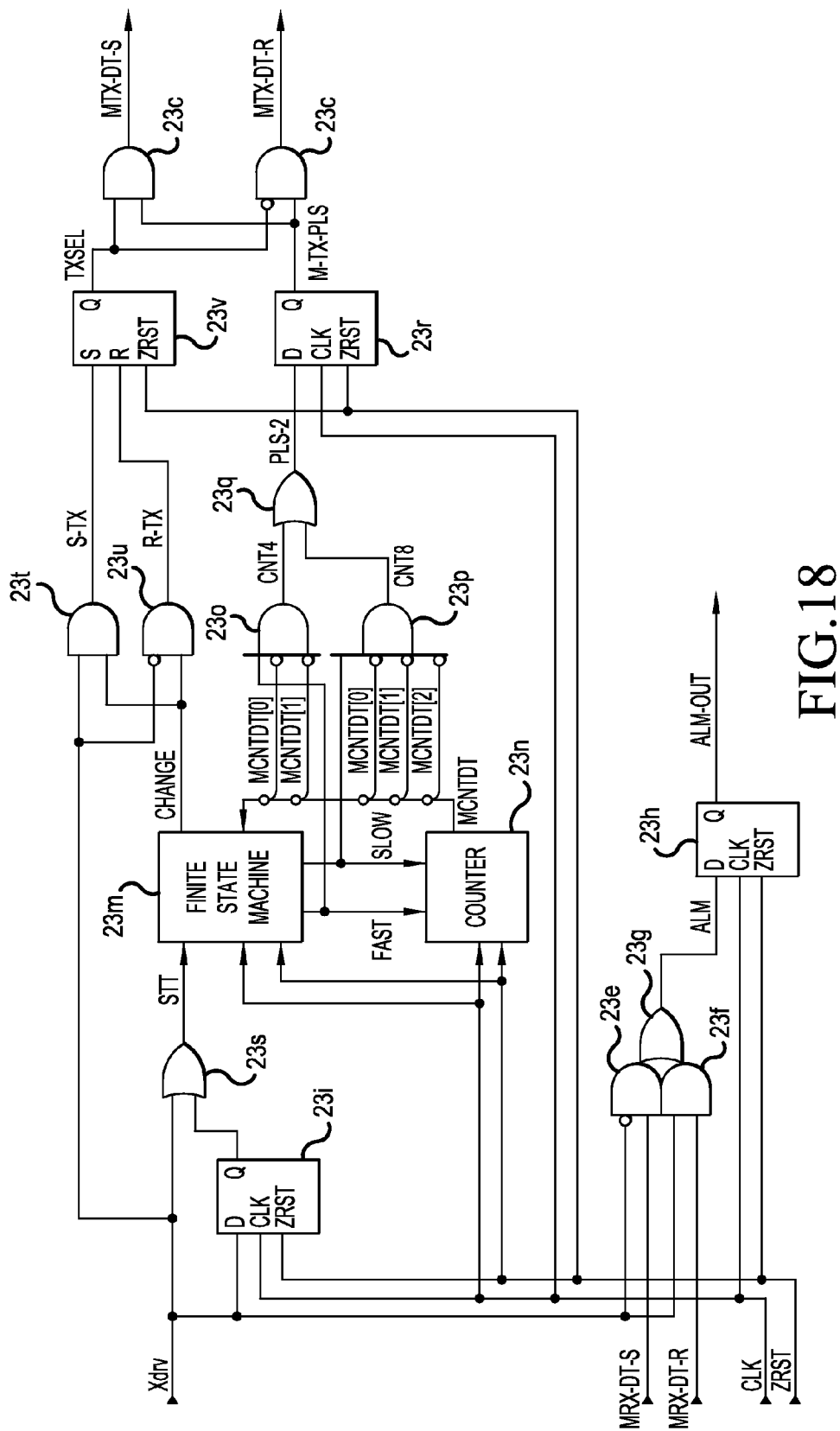
FIG. 18 shows an example of specific construction of a master control circuit according to still another embodiment of the invention.

The master control circuit 23 can be constructed as shown in FIG. 18. The master control circuit 23 of FIG. 18 generates a pulse signal with the first pulse interval (i.e. short period) at the moment of change of the control signal Xdrv from an H level to an L level or from an L level to an H level, and then generates a pulse signal with the second pulse interval (i.e. long period). At this moment of change in the pulse interval of the pulse signal, one of the first and second transmitting/receiving circuits 21 and 22 is changed over for transmitting operation and the other is set for receiving operation. More specifically, an OR circuit 23s is used in place of the exclusive OR circuit 23j to deliver the signal STT to the finite state machine 23m through the OR circuit 23s.

Gate circuits 23t and 23u are alternatively activated according to the control signal Xdrv and transfer an output CHANGE of the finite state machine 23m to a flip-flop 23v to control setting and resetting of the flip-flop 23v. The set output of the flip-flop 23v alternatively activates the gate circuits 23c and 23d to selectively generate the transmitting signal SRX-DT-S for giving to the first transmitting/receiving circuit 21 or the transmitting signal SRX-DT-R for giving to the second transmitting/receiving circuit 22.

Figure 19:
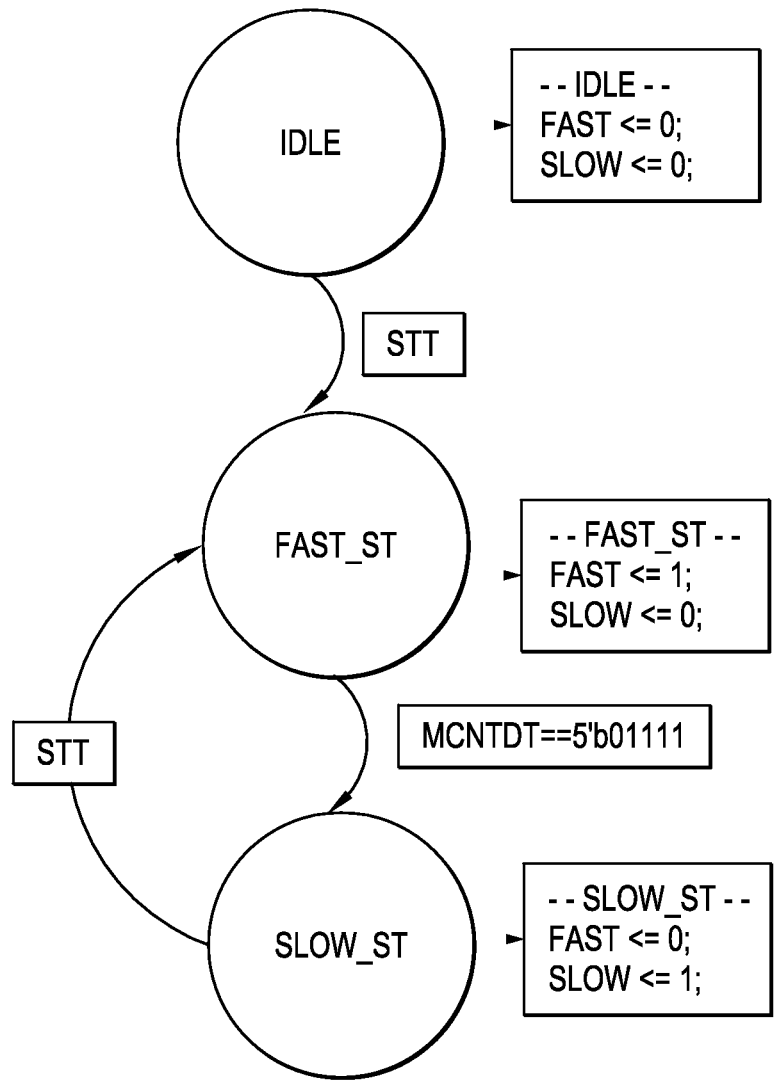
FIG. 19 is a state transition diagram of a finite state machine in the master control circuit shown in FIG. 18.

The finite state machine 23m in this case can be constructed to perform the state transition as shown in FIG. 19. When the signal STT is given in the default state IDLE, the state transitions to a fast counting state FAST-ST, delivers the control signal FAST, and triggers the counter 23n to start counting operation from the binary value '00000'. When the counted value MCNTDT by the counter 23n reaches a binary value of '01111', the state transitions to a slow counting state SLOW-ST. When the signal STT is given in the slow counting state SLOW-ST, the state transitions again to the fast counting state FAST-ST. After that, the finite state machine transitions state between the slow counting state SLOW-ST and the fast counting state FAST-ST.

Figure 20:
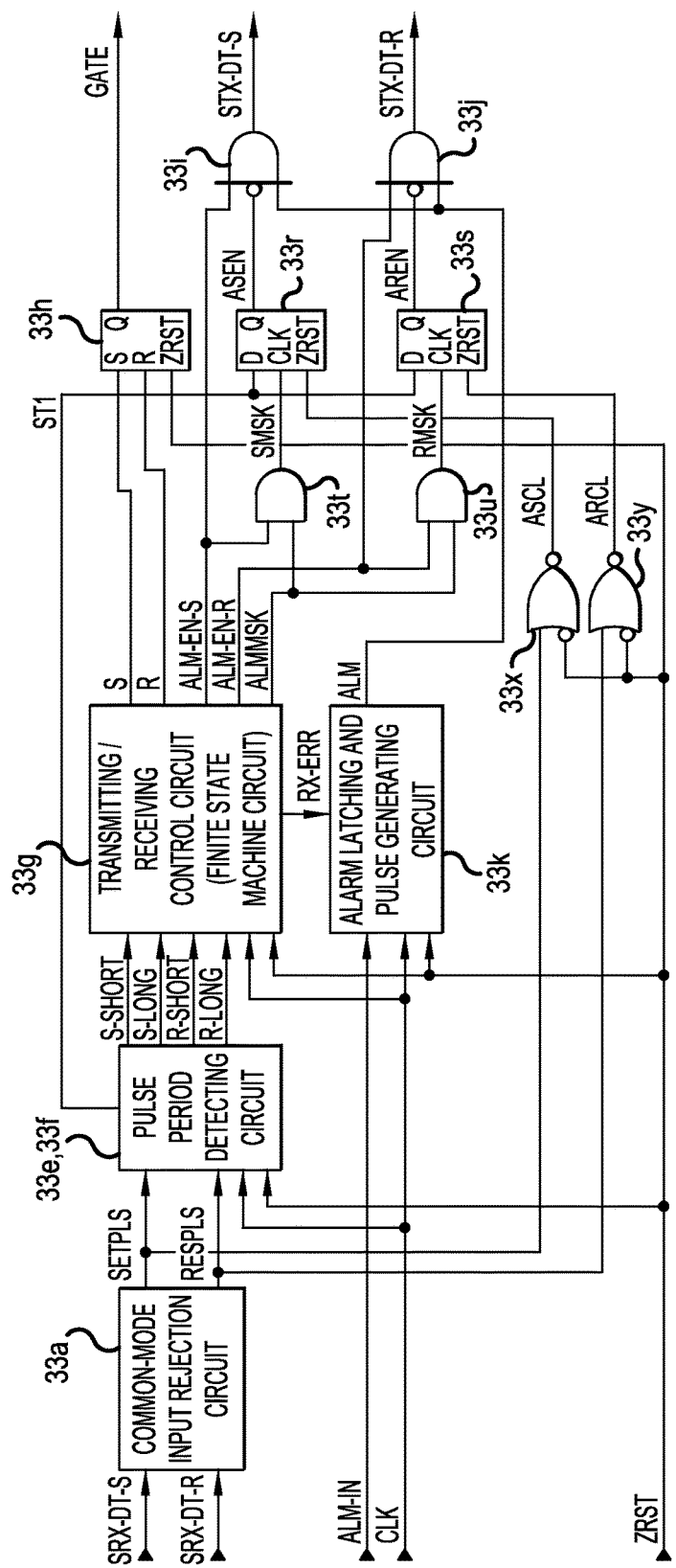
FIG. 20 shows an example of specific construction of a slave control circuit that corresponds to the master control circuit of FIG. 18.

Whereas the master control circuit 23 is constructed as described above, the slave control circuit 33 is constructed as shown in FIG. 20, for example. In addition to the construction shown in FIG. 17, the slave control circuit 33 of FIG. 20 is provided with AND circuits 33t and 33u that detect an alarm signal-generating timing using the alarm output enabling signals ALM-EN-S and ALM-EN-R from the transmitting/receiving control circuit (i.e. a finite state machine) 33g. The output of the AND circuits 33t and 33u operates the latching circuit 33r and 33s to latch the detection result ST1 of the pulse signal with the first pulse interval (i.e. a short period) delivered by the pulse period detecting circuits 33e and 33f. The outputs of the latching circuits 33r and 33s control the gate circuits 33i and 33j to deliver the transmitting signals STX-DT-S and STX-DT-R responding to the alarm signal ALM.

Figure 21:
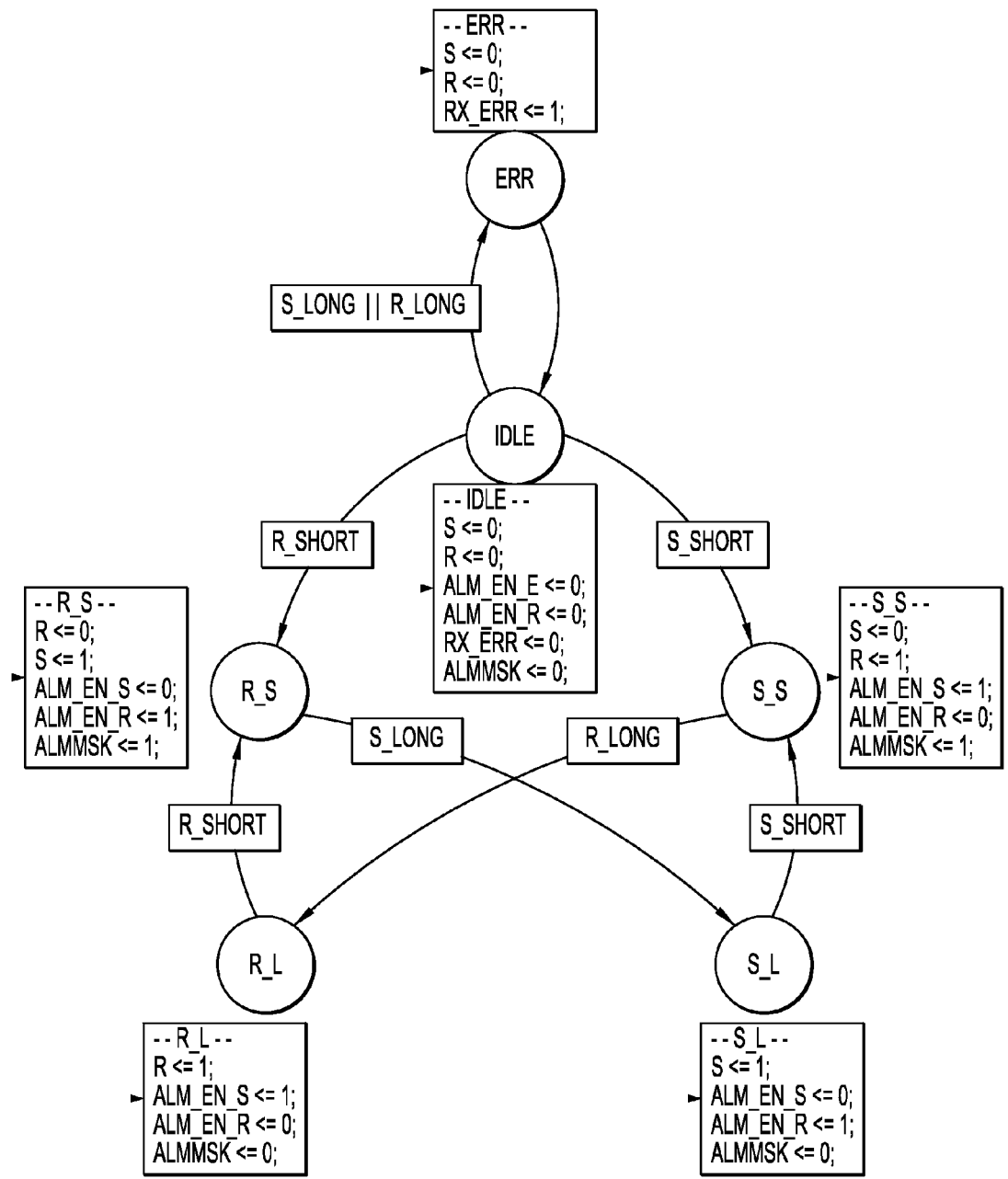
FIG. 21 is a state transition diagram of the signal transmitting/receiving control circuit (i.e. a finite state machine circuit) in the slave control circuit of FIG. 20.

The NOR circuits 33x and 33y, according to the reset signal ZRST or the output signal of the common-mode input rejection circuit 33a, reset the latching circuit 33r and 33s, respectively, to prohibit the output of the transmitting signals STX-DT-S and STX-DT-R. In this case, the transmitting/receiving control circuit 33g (i.e. a finite state machine circuit) can be constructed to perform the transition of state as shown in FIG. 21, for example. It is sufficient to conduct error detection only for the default state IDLE.

Figure 22:
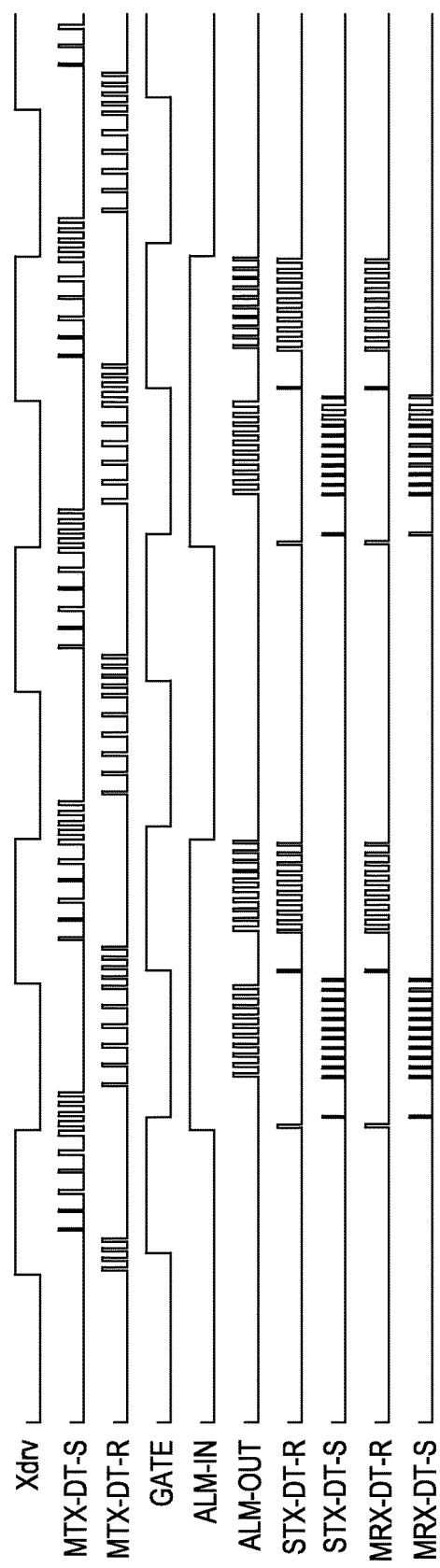
FIG. 22 is an operational timing chart in the embodiment shown in FIGS. 18 through 21.

FIG. 22 shows the operational timing chart in the signal transmission device described above. It is shown that the signals STX-DT-S and STX-DT-R representing the alarm signal ALM-IN can be transmitted to the master circuit 20 at the timing of generation of the alarm signal ALM-IN regardless of the order of changing the period of the pulse signals of the transmitting signals STX-DT-S and STX-DT-R that are generated corresponding to the control signal Xdrv. Thus, this signal transmission device is advantageous in quickly informing the master circuit 20 of generation of an alarm signal ALM-IN.

As described thus far, a signal transmission device according to the embodiments of the present invention allows simultaneous bi-directional communication between a master circuit 20 and a slave circuit 30. When a signal transmission device of the invention is applied to a switching power supply as an isolating circuit 6 shown in FIG. 1 for signal transmission between the switching control circuit 3 and the high side driver circuit 4, in particular, the control signal Xdrv for driving the first switching element Q1 is transmitted to the high side driver circuit 4 and at the same time, the switching control circuit 3 can always receive an alarm signal ALM-IN that indicates abnormality occurred in the first switching element Q1. Thus, the device is very advantageous in operating the high side driver circuit 4 that operates on a voltage level different from that of the switching control circuit 3.

Since in the signal transmission device of the invention, each of the control signal Xdrv and the alarm signal ALM-IN is transmitted with distinct signals of a setting signal S and a resetting signal R, the signal transmission is scarcely affected by transmission noises as compared with the case disclosed in Patent Document 2 in which the set signal and reset signal are transmitted with different periods of pulse signals. Further, a circuit construction of the device of the invention can be produced in a smaller scale and at a lower cost as compared with the device disclosed in Patent Document 3. Moreover, the device of the invention does not require a frequency of signals in transmission in the RF band, which is the case in the device disclosed in Patent Document 3, but allows a lower frequency of the pulse signal transmitted through the transformers 11 and 12. This offers an advantage of reduced power consumption in the transmitting/receiving circuits 21, 22, 31, and 32.

The present invention is not limited to the embodiment examples described above. For example, the first and second pulse intervals and the number of pulses of the pulse signals of the transmitting signals STX-DT-S and STX-DT-R that are generated on detecting the leading and falling edges of the control signal Xdrv can be determined corresponding to the specification of the repeating ON/OFF period of the control signal Xdrv.

The signal transmission device 10 can be applied to a switching power supply different from the one described above referring to FIG. 1. The signal transmission device 10 can be applied, for example, to a switching power supply in which a first driver circuit drives a first switching element Q1 in the high side operating on a reference voltage of the input voltage and a second driver circuit drives a second switching element Q2 in the lower side operating on a reference voltage of the voltage at the connection point between the first and second switching elements. In this switching power supply, an isolating circuit 6, i.e. the signal transmission device 10, is arranged between the switching control circuit operating on a reference voltage of the input voltage and the second driver circuit. The signal transmission device of the invention can also be applied to electronic devices other than switching power supplies. It should be acknowledged that the present invention can be practiced with various modifications without departing from the spirit and scope of the invention.

What is claimed is:

1. A signal transmission device comprising:
   first and second transformers provided in parallel;
   a master circuit connected to terminals in a primary side of the first transformer and terminals in a primary side of the second transformer;
   a slave circuit connected to terminals in a secondary side of the first transformer and terminals in a secondary side of the second transformer;
   the master circuit including;
      a first transmitting/receiving circuit for transmitting/ receiving a signal to/from a side of the slave circuit through the first transformer,
      a second transmitting/receiving circuit for transmitting/ receiving a signal to/from the side of the slave circuit through the second transformer, and
      a master control circuit that detects a leading edge and a falling edge of a transmitting signal to be transmitted to the slave circuit, sets one of the transmitting/receiving circuits for transmitting operation and the other for receiving operation, and transmits a signal with varying pulse intervals after passing a predetermined period of time since the detection of the leading edge or the falling edge;
   the slave circuit including;
      a third transmitting/receiving circuit for transmitting/ receiving a signal to/from a side of the master circuit through the first transformer,
      a fourth transmitting/receiving circuit for transmitting/ receiving a signal to/from the side of the master circuit through the second transformer, and
      a slave control circuit that detects variation of the pulse intervals of a signal transmitting/receiving through the third and fourth transmitting/receiving circuit, sets one of the third and fourth transmitting/receiving circuits for receiving operation and the other for transmitting operation, and generates and transmits a pulse signal corresponding to transmitting signal to be transmitted to the master circuit.

2. The signal transmission device according to claim 1, wherein the slave control circuit comprises: a pulse period detecting circuit for detecting change of the pulse intervals of a signal transmitting/receiving through the third and fourth transmitting/receiving circuit, and a latching circuit for demodulating the transmitting signal from the master circuit corresponding to a result of detection by the pulse period detecting circuit.

3. The signal transmission device according to claim 2, wherein the pulse period detecting circuit receives a signal given from the third and fourth transmitting/receiving circuit through a common-mode input rejection circuit and detects change of the pulse interval of the signal through the common-mode input rejection circuit.

4. The signal transmission device according to claim 1, wherein the master control circuit comprises a latch and timer circuit that demodulates a signal transmitted from the slave circuit corresponding to a state of the signal received through the first and second transmitting/receiving circuit.

5. The signal transmission device according to claim 1, wherein the master control circuit detects the leading and falling edges of the transmitting signal and transmits a pulse signal with a first pulse interval for a predetermined period of time and then transmits a pulse signal with a second pulse interval that is longer than the first pulse interval.

6. The signal transmission device according to claim 1, wherein each of the first and second transformers is a coreless micro-transformer.

7. A switching power supply comprising:
   a main body of the switching power supply that includes first and second switching elements connected in series, the switching elements being ON/OFF-controlled alternately to switch an input power, and the main body delivering electric power from a series connection point of the first and second switching elements to a load;
   a switching control circuit that generates a control signal to ON-drive alternately the first and second switching elements;
   first and second driver circuits, the first driver circuit being provided for ON-driving the first switching element receiving the control signal and the second driver circuit being provided for ON-driving the second switching element receiving the control signal;

an isolating circuit that performs electrical isolation between one of the first and second driver circuits and the switching control circuit and transmits the control signal generated by the switching control circuit to the one of the first and second driver circuits, the isolating circuit including:

first and second transformers provided in parallel;

a master circuit connected to terminals in a primary side of the first transformer and terminals in a primary side of the second transformer;

a slave circuit connected to terminals in a secondary side of the first transformer and terminals in a secondary side of the second transformer;

the master circuit including;
- a first transmitting/receiving circuit for transmitting/receiving a signal to/from a side of the slave circuit through the first transformer,
- a second transmitting/receiving circuit for transmitting/receiving a signal to/from the side of the slave circuit through the second transformer, and
- a master control circuit that detects a leading edge and a falling edge of a transmitting signal to be transmitted to the slave circuit, sets one of the transmitting/receiving circuits for transmitting operation and the other for receiving operation, and transmits a signal with varying pulse intervals after passing a predetermined period of time since the detection of the leading edge or the falling edge;

the slave circuit including;
- a third transmitting/receiving circuit for transmitting/receiving a signal to/from a side of the master circuit through the first transformer,
- a fourth transmitting/receiving circuit for transmitting/receiving a signal to/from the side of the master circuit through the second transformer, and
- a slave control circuit that detects variation of the pulse intervals of a signal transmitting/receiving through the third and fourth transmitting/receiving circuit, sets one of the third and fourth transmitting/receiving circuits for receiving operation and the other for transmitting operation, and generates and transmits a pulse signal corresponding to transmitting signal to be transmitted to the master circuit.

8. The switching power supply according to claim 7, wherein
the first driver circuit operates on a reference voltage of a voltage at the series connection point of the first and second switching elements and drives the first switching element in a high side, and the second driver circuit operates on a reference voltage of a ground potential and drives the second switching element in a low side, and
the isolating circuit is provided between the switching control circuit that operates on the reference voltage of the ground potential and the first driver circuit.

9. The switching power supply according to claim 7, wherein
the first driver circuit operates on a reference voltage of the input voltage and drives the first switching element in a high side, and the second driver circuit operates on a reference voltage of a voltage at the series connection point of the first and second switching elements and drives the second switching element in a low side, and
the isolating circuit is provided between the switching control circuit that operates on the reference voltage of the input voltage and the second driver circuit.

10. The switching power supply according to claim 7, wherein the isolating circuit transmits the control signal toward the driver circuit and transmits an alarm signal indicating abnormality detected in the side of the driver circuit to the switching control circuit.

11. The switching power supply according to claim 7, wherein the first and the second switching elements are high voltage IGBTs or MOS-FETs and compose a half-bridge to supply electric power to the load.

\* \* \* \* \*